(12) United States Patent
Vozenilek et al.

(10) Patent No.: US 8,926,333 B2
(45) Date of Patent: Jan. 6, 2015

(54) DEVICE, SYSTEM, AND METHOD FOR SIMULATING BLOOD FLOW

(71) Applicant: SIMNEXT, LLC, Peoria, IL (US)

(72) Inventors: John Vozenilek, Peoria, IL (US); Thomas Cusack, Peoria, IL (US); Sabeen Admani, Arlington Heights, IL (US); Eliot Bethke, Arlington Heights, IL (US); Michael Regan, Rockford, IL (US)

(73) Assignee: SIMNEXT, LLC, Peoria, IL (US)

( * ) Notice: Subject to any disclaimer, the term of this patent is extended or adjusted under 35 U.S.C. 154(b) by 23 days.

(21) Appl. No.: 13/836,148

(22) Filed: Mar. 15, 2013

(65) Prior Publication Data

US 2014/0272872 A1  Sep. 18, 2014

(51) Int. Cl.
*G09B 23/28* (2006.01)
*G09B 23/30* (2006.01)

(52) U.S. Cl.
CPC .............. *G09B 23/303* (2013.01); *G09B 23/28* (2013.01)
USPC ............... 434/268; 417/28; 417/45; 417/415; 600/437; 437/262

(58) Field of Classification Search
USPC ........................................................ 434/268
See application file for complete search history.

(56) References Cited

U.S. PATENT DOCUMENTS

| | | | | |
|---|---|---|---|---|
| 3,529,144 A | * | 9/1970 | Kurt, Jr. et al. | 708/845 |
| 4,325,072 A | * | 4/1982 | Rosel | 346/140.1 |
| 4,974,461 A | * | 12/1990 | Smith et al. | 73/865.6 |
| 5,027,641 A | * | 7/1991 | Costello, Jr. | 73/1.64 |
| 5,061,187 A | * | 10/1991 | Jerath | 434/262 |
| 5,284,423 A | * | 2/1994 | Holdsworth et al. | 417/28 |
| 5,513,992 A | * | 5/1996 | Refait | 434/267 |
| 5,609,485 A | * | 3/1997 | Bergman et al. | 434/262 |
| 6,039,573 A | * | 3/2000 | Petrick et al. | 434/268 |
| 6,205,871 B1 | * | 3/2001 | Saloner et al. | 73/866.4 |
| 6,210,168 B1 | * | 4/2001 | Aiger et al. | 434/262 |
| 6,273,728 B1 | * | 8/2001 | van Meurs et al. | 434/268 |
| 6,336,812 B1 | * | 1/2002 | Cooper et al. | 434/267 |
| 6,595,923 B2 | * | 7/2003 | Sjoblom | 600/437 |

(Continued)

OTHER PUBLICATIONS

Diagnostic Ultrasound Safety (hereinafter "NCRP"), "A summary of the technical report Exposure Criteria for Medical Diagnostic Ultrasound: II. Criteria Based on all Known Mechanisms", issued by the National Council on Radiation Protection and Measurements, accessed at: http://www.ncrponline.org/Publications/Reports/Misc_PDFs/Ultrasound%20Summary--.*

*Primary Examiner* — Xuan Thai
*Assistant Examiner* — James Hull
(74) *Attorney, Agent, or Firm* — Jones Day

(57) ABSTRACT

A device for simulating blood flow including an anatomical unit and a waveform generator for generating waveforms. The waveform generator includes a pump capable of pumping a fluid through at least one fluid line and thereby transmitting the waveform from the waveform generator through the fluid line. The waveform generator further includes a bifurcation point capable of splitting the fluid line into additional fluid lines, where the fluid lines include a main line and a parallel line. Additionally, the waveform generator includes valves capable of at least partially occluding fluid flow. The device further includes a reservoir capable of housing the fluid, where the waveforms enter and exit the anatomical unit and the waveform generator through the fluid lines simulating blood flow.

19 Claims, 32 Drawing Sheets

(56) References Cited

U.S. PATENT DOCUMENTS

| | | | |
|---|---|---|---|
| 7,059,168 B2* | 6/2006 | Hibi et al. | 73/1.86 |
| 7,255,565 B2* | 8/2007 | Keegan | 434/272 |
| 7,510,398 B1* | 3/2009 | Thornton | 434/262 |
| 7,845,949 B2* | 12/2010 | Wilkins et al. | 434/268 |
| 8,206,303 B2* | 6/2012 | Ragauskas et al. | 600/454 |
| 8,241,042 B2* | 8/2012 | Rosenthal et al. | 434/268 |
| 8,535,061 B2* | 9/2013 | Boutchko et al. | 434/267 |
| 2004/0126746 A1* | 7/2004 | Toly | 434/262 |
| 2005/0131307 A1* | 6/2005 | Ruiter et al. | 600/485 |
| 2005/0214727 A1* | 9/2005 | Stoianovici et al. | 434/262 |
| 2007/0021816 A1* | 1/2007 | Rudin | 623/1.4 |
| 2007/0243512 A1* | 10/2007 | King | 434/268 |
| 2008/0125663 A1* | 5/2008 | Golijanin | 600/479 |
| 2010/0041005 A1* | 2/2010 | Campbell et al. | 434/267 |
| 2011/0250578 A1* | 10/2011 | Pappin | 434/265 |
| 2012/0245405 A1* | 9/2012 | Tatum et al. | 600/17 |
| 2013/0037485 A1* | 2/2013 | Wilt et al. | 210/646 |

* cited by examiner

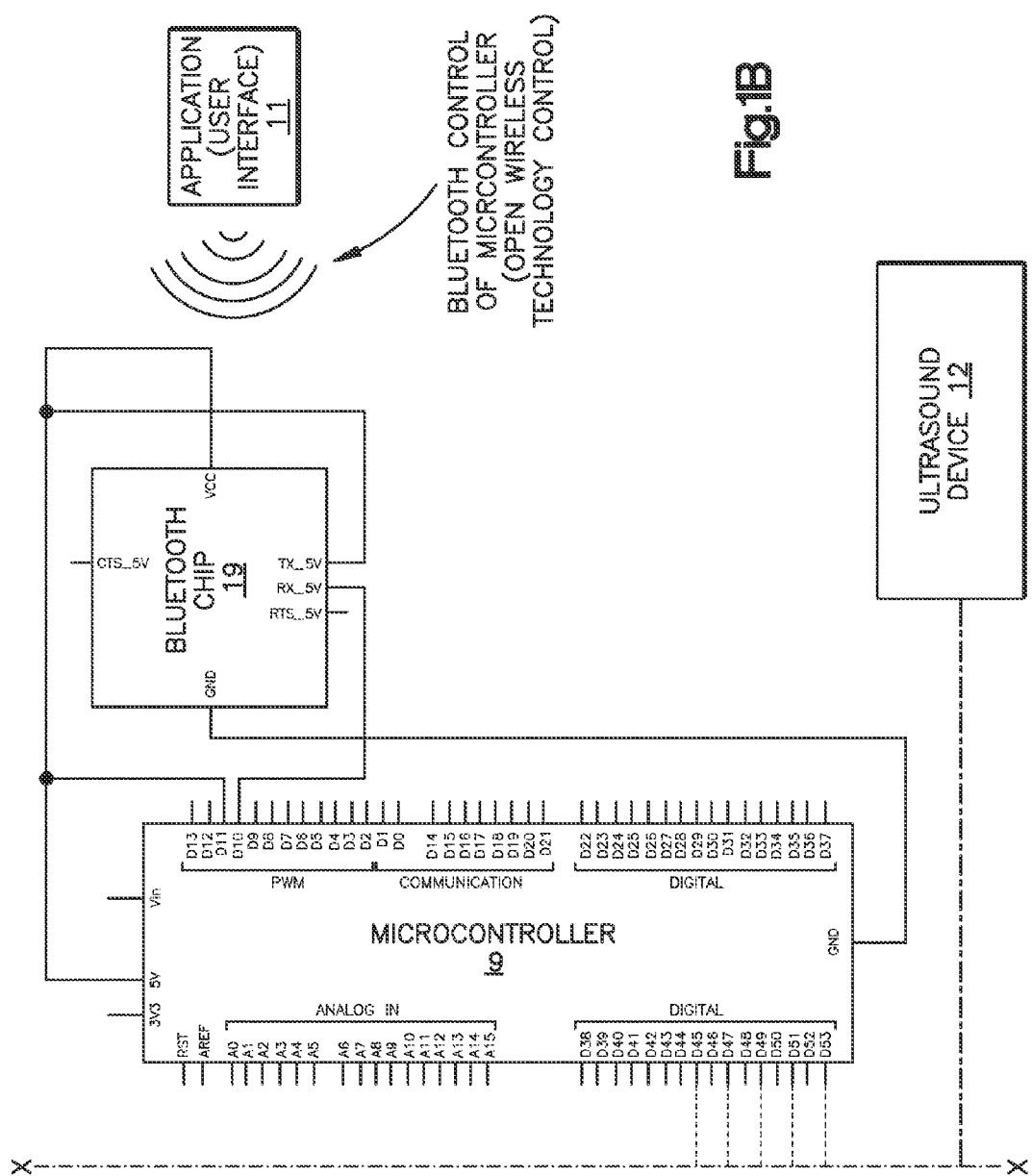

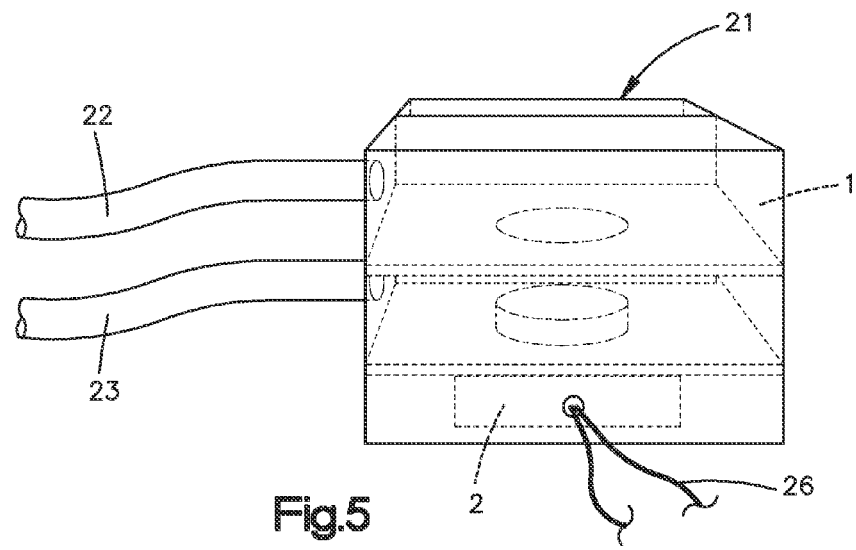
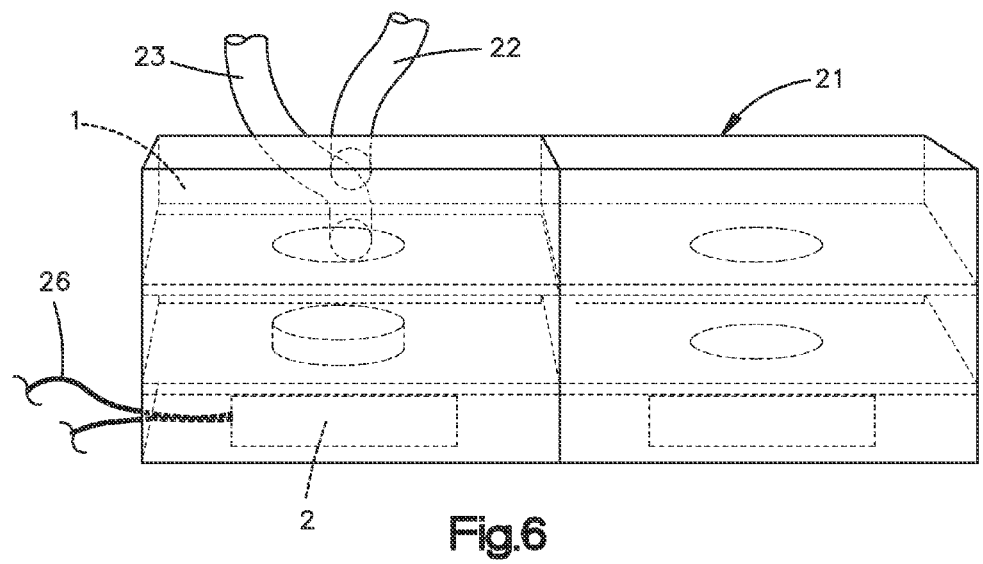

IMAGE OF MODEL

DEVICE, SYSTEM, AND METHOD FOR SIMULATING BLOOD FLOW

STATEMENT REGARDING FEDERALLY SPONSORED RESEARCH OR DEVELOPMENT

This application is not the subject of any federally sponsored research or development.

THE NAMES OF THE PARTIES TO A JOINT RESEARCH AGREEMENT

There has been no joint research agreements entered into with any third parties.

BACKGROUND OF THE INVENTION

1. Field of the Invention

The embodiments of the present invention relate generally to a device, system, and method for simulating blood flow. In particular, the embodiments of the present invention are directed to a training device that produces flow patterns in a fluid for the purpose of obtaining information and awareness of physiological blood waveforms via ultrasound technology. The training device of the embodiments of the present invention may be used as part of a system for analyzing blood/fluid flow and/or a method of analyzing blood/fluid flow.

2. Description of the Related Art

Previous ultrasound training devices do not include a fluid velocity profile that matches physiological conditions common in the field of diagnostic radiology.

In the prior art, applicants are not aware of any existing simulation devices that allow for the precise simulation of blood flow in a pathological condition. For example, there are several devices that simulate human anatomy for various purposes including devices that provide palpable pulsations over artificial anatomical landmarks. One example is a mannequin arm that includes palpable pulsations for the practice of the insertion of an intravenous catheter. However, such devices do not precisely simulate blood flow in a pathological condition.

In other prior art anatomical models, artificial "blood" is encased in a soft tissue-like material to practice venipunture (i.e., the process of obtaining intravenous access for the purpose of intravenous therapy or for blood sampling of venous blood). However, in these devices, the fluid does not move as would be found in the true form. For example, one model used for practicing the access of the internal jugular by a large intravenous catheter uses a suction bulb attached to a large tube to simulate the pulsatile carotid artery, where the bulb is compressed by hand. Similar anatomical models of the leg and the upper arm with a hand-compressible bulb exist in the prior art. Further, an anatomical model with an automated pump exists for the neck and torso, but this device does not produce a robust physiologic model of the true pressures and velocities of human blood flow.

Therefore, there exists a need for a device that produces flow patterns in a fluid for the purpose of obtaining information and awareness of physiological blood waveforms via ultrasound technology or the like.

SUMMARY OF THE INVENTION

For the reasons included above, it is therefore an object of embodiments of the present invention to provide a training device that produces flow patterns in a fluid for the purpose of obtaining information and awareness of physiological blood waveforms via ultrasound technology, and to supply ultrasound simulation for the purpose of identifying pathological waveforms with the use of ultrasound technology.

The embodiments of the present invention preferably include a device for simulating blood flow including an anatomical unit and a waveform generator for generating waveforms. The waveform generator includes a pump capable of pumping a fluid through at least one fluid line and thereby transmitting the waveform from the waveform generator through the fluid line. The waveform generator further includes a bifurcation point capable of splitting the fluid line into additional fluid lines, where the fluid lines include a main line and a parallel line. Additionally, the waveform generator includes valves capable of at least partially occluding fluid flow. The device further includes a reservoir capable of housing the fluid, where the waveforms enter and exit the anatomical unit and the waveform generator through the fluid lines simulating blood flow.

Yet another embodiment of the present invention is directed to a device for simulating blood flow including an anatomical unit that replicates at least one testicle, and a waveform generator for generating waveforms. The waveform generator includes a positive displacement electric fluid pump capable of pumping a fluid simulating blood flowing through at least one fluid line simulating an artery and thereby transmitting the waveform from the waveform generator through the fluid line. The waveform generator further includes a bifurcation point capable of splitting the fluid line into a plurality of fluid lines, where the plurality of fluid lines include a main line and a parallel line. Additionally, the waveform generator includes an arterial flow fluid reservoir capable of housing the fluid, and a plurality of valves capable of at least partially occluding fluid flow. The plurality of valves includes: a parallel line pinch valve on the parallel line disposed downstream of the bifurcation point and upstream of the arterial flow fluid reservoir, and a main line pinch valve on the main line disposed downstream of the bifurcation point and upstream of a proportional valve. The proportional valve is disposed upstream from the anatomical unit and is capable of modulating static resistance of the waveform through the main line. The device for simulating blood flow further includes a reversible pump, where the reversible pump is a positive displacement electric fluid pump capable of pumping a fluid simulating blood flowing through at least one fluid line simulating a vein. Additionally, the device for simulating blood flow includes a venous flow fluid reservoir capable of housing the fluid, a programmable circuit board capable of controlling the pumps, a plurality of air pockets, an ultrasound machine to obtain information from the waveforms, and a control system for controlling the device. The waveform generator and the fluid lines create a fluid velocity profile that matches physiological conditions common to the field of diagnostic radiology.

The embodiments of the present invention further include a system for simulating blood flow including a device for simulating blood flow. The device for simulating blood flow preferably includes an anatomical unit and a waveform generator for generating waveforms. The waveform generator includes a pump capable of pumping a fluid through at least one fluid line and thereby transmitting the waveform from the waveform generator through the fluid line, and a bifurcation point capable of splitting the fluid line into a plurality of fluid lines, where the plurality of fluid lines include a main line and a parallel line. The waveform generator further includes a plurality of valves capable of at least partially occluding fluid flow, a proportional valve capable of modulating static resistance of the waveform through a fluid line, and a reservoir capable of housing the fluid. The system further includes a programmable circuit board capable of controlling at least the pump, an air pocket, an ultrasound machine to obtain information from the waveforms, and a dual fluid line control system. Waveforms enter and exit the waveform generator through the fluid lines, and the waveform generator and the fluid lines create a fluid velocity profile that matches physiological conditions common to the field of diagnostic radiology.

Yet another embodiment of the present invention is directed to a method of simulating blood flow including creating a waveform using a waveform generator. The waveform generator preferably includes a pump capable of pumping a fluid through at least one fluid line and thereby transmitting the waveform from the waveform generator through the fluid line, and a bifurcation point capable of splitting the fluid line into a plurality of fluid lines, where the plurality of fluid lines include a main line and a parallel line. The waveform generator further includes a plurality of valves capable of at least partially occluding fluid flow, a proportional valve capable of modulating static resistance of the waveform through a fluid line, a reservoir capable of housing the fluid, and a programmable circuit board capable of controlling at least the pump. The method of simulating blood flow further includes creating a fluid velocity profile through fluid lines that enter and exit the waveform generator, where the fluid velocity profile matches physiological conditions common to the field of diagnostic radiology, and using an ultrasound device to obtain information from the waveforms.

BRIEF DESCRIPTION OF THE DRAWINGS

Preferred features of the embodiments of the present invention are disclosed in the accompanying drawings, wherein similar reference characters denote similar elements throughout the several views, and wherein:

FIG. 1B is a partial flow diagram of a testicular torsion simulation device according to an embodiment of the present invention, where the remainder of the diagram is beyond line X-X (see FIG. 1A for continuation);

FIG. 5 is a close-up side view of a portion of a waveform generator according to an embodiment of the present invention;

FIG. 6 is a rear view of a portion of a waveform generator according to an embodiment of the present invention;

DETAILED DESCRIPTION

Figure 1A:
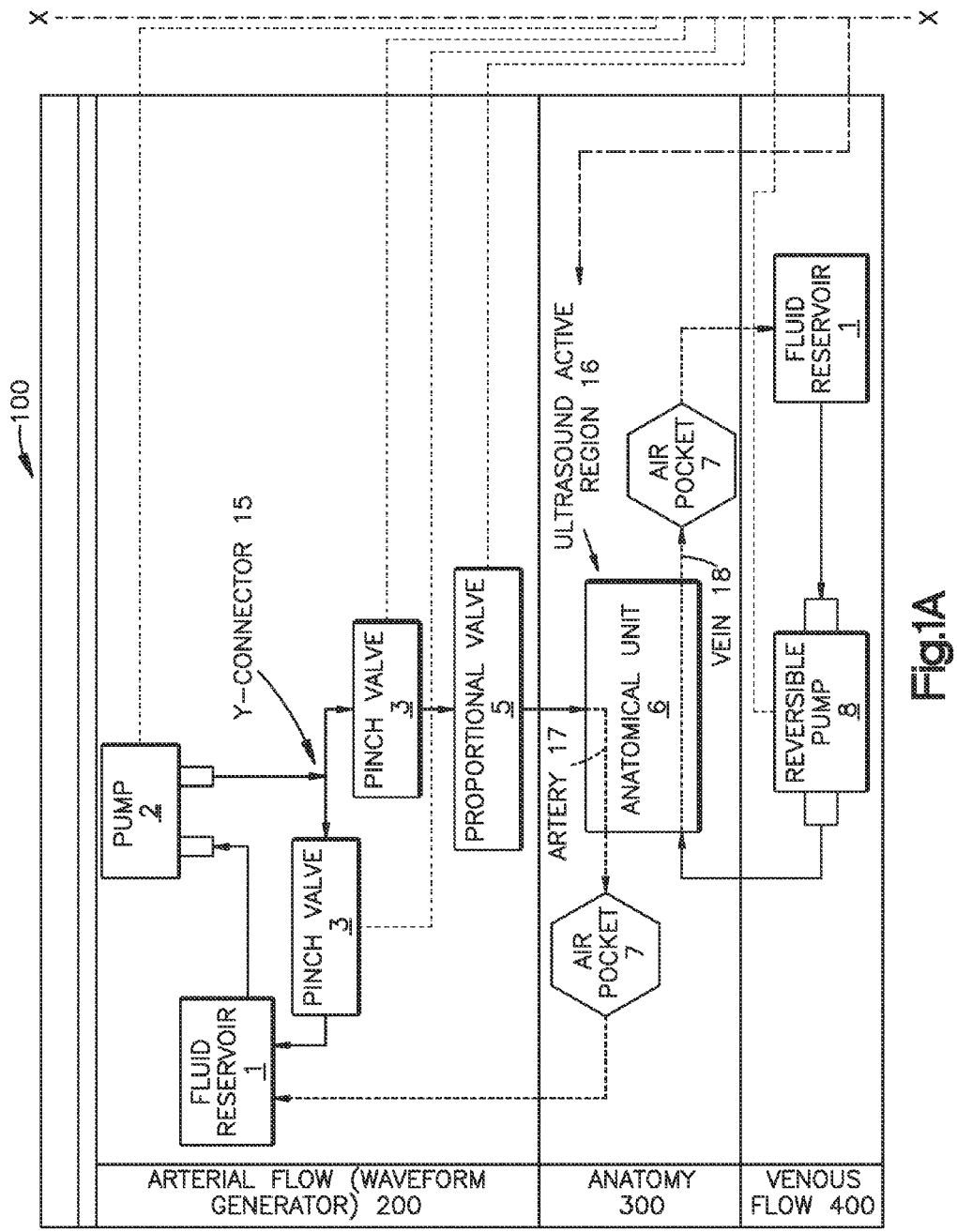
FIG. 1A is a partial flow diagram of a testicular torsion simulation device according to an embodiment of the present invention, where the remainder of the diagram is beyond line X-X (see FIG. 1B for continuation)

The embodiments of the present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete and will convey the scope of the invention to those skilled in the art.

In the following description, like reference characters designate like or corresponding parts throughout the figures. Additionally, in the following description, it is understood that terms such as "top," "bottom," "side," "front," "back," "inner," "outer," and the like, are words of convenience and are not to be construed as limiting terms.

Described throughout this application is a training device that produces flow patterns in a fluid for the purpose of obtaining information and providing the user/observer a better awareness of physiological blood waveforms. The embodiments of the invention may use ultrasound technology in order for a user to study physiological blood waveforms using the training device.

The embodiments of the present invention are designed to simulate (with high precision) the blood flow through abnormal vessels (or normal vessels), and the embodiments of the present invention are designed to replicate that signal accurately and reliably on live clinical ultrasound devices.

An embodiment of the present invention preferably includes a training device that includes an anatomical unit, where the anatomical unit seeks to replicate exterior similarity to one or more sections of the human body. For example, and as described in more detail below, the anatomical unit may replicate carotid blood vessels, leg blood vessels, arm blood vessels, the testicles, abdominal vasculature, cardiac chambers, brain vasculature, chest vasculature, or the like. One of ordinary skill will understand that the anatomical units of the present invention may include replicas of other parts of the human anatomy (or the anatomy of another animal) that are not described herein, and that the anatomical units described are provided as examples of what may be included in the embodiments of the present invention. Moreover, one skilled in the art will understand that the anatomical units may be outside the realm of replicating physiology and may represent, for example, mechanical flows.

The embodiments of the present invention also preferably include a waveform generator, which may be a separate element from the anatomical unit, preferably housed in its own casing. One of the purposes of the anatomical unit and waveform generator is to supply an ultrasound simulation for the purpose of identifying pathological waveforms with the use of ultrasound technology. In other words, the anatomical unit and waveform generator of the embodiments of the present invention are capable of providing rhythmic flow of a fluid at such pressure and velocity that it would represent normal and pathological arterial and/or venous flow. This flow is detectable in the anatomic model using a live clinical ultrasound device (including hand held portable devices) or the like. The waveforms presented by the embodiments of the present invention will be recognizable by clinicians as being at or near human pressures and velocities, in addition to having patterns consistent with normal and pathological conditions.

The embodiments of the present invention incorporate several technologies and components that perform functions previously unavailable to training devices. For example, an embodiment of the present invention includes a fluid velocity profile that matches physiological conditions common to the field of diagnostic radiology. The creation of a fluid waveform in an anatomically representative model allows for medical personnel (for example, including, but not limited to, radiologists, oncologists, general surgeons, various technicians, and/or urologists) and any other medically trained staff (for example, anyone who would handle ultrasound technology or analyze the information gathered from an ultrasound procedure) to become familiar with specific pathology obtainable through ultrasound targeting blood flow (i.e., Doppler ultrasound).

As used throughout this application, the mechanical elements used to create the waveforms are referred to as the waveform generator. In the preferred embodiment of the present invention, waveforms exit the waveform generator through fluid lines and enter the waveform generator through fluid lines included within an anatomically representative unit. Each waveform is created mechanically from a pump device and then modified by various mechanical elements within the waveform generator before passing through the fluid line in the anatomical unit that is to be explored by the user. With the careful adjustment of both timing and range of the mechanical devices, various waveforms can be generated for the purpose of training medical personnel to both locate the fluid line within the anatomy with the use of an ultrasound machine and to correctly identify pathological flow information from the specific waveform observed.

The anatomical units of the embodiments of the present invention may be shaped to simulate one or more parts of the human body from the exterior. The anatomical units may include a sealed, isolated container. The sealed container has the ability to connect fluid lines maintained within the sealed container to an exterior device, and this will vary depending on the simulation. The anatomical units may contain hydraulic lines and/or positive displacement fluid pumps (see description of element 2) for altering or transmitting the waveform from the waveform generator. The anatomical units may attempt to replicate any anatomical feature of the body. For example, the anatomical units may be represented in a silicone, latex rubber, or other soft rubber composite (or the like) seeking to simulate skin texture which may wholly encase the aforementioned fluid-carrying tubing and pumps. The anatomical units may also represent animal (non-human) anatomy.

The waveform generator preferably includes a positive displacement electric fluid pump 2 that self-primes fluid from a controlled volume. The waveform generator may also include a fluid containing reservoir 1, and it may eject the fluid into a flexible rubber or silicone tubing. The pump 2 will be referred to as the proximal point, as would the human heart. The tubing extends distally from the output of the pump 2 to a bifurcation point. The bifurcation point will be herein referred to as a Y-connection 15 for the sake of simplicity.

The embodiments of the present invention may also include a dual fluid line control system (the main and parallel drives). The use of multiple fluid carrying lines within the same circuit allows for extra fine control of waveforms and also serves as a pressure regulatory mechanism. Both of the fluid lines distal to the Y-connection 15 lead to valves, which may be solenoid operated valves. The valves partially or fully occlude the fluid flow mechanically. One of ordinary skill in the art will understand that partially occluding the fluid flow means to partially close, shut, or stop up the fluid flow. A shaft passes through the solenoid coil of the solenoid valves. When the solenoid coil is energized, it extends the shaft head and forces the tubing at the end of the shaft against a stationary mass, thus occluding the tubing. By varying the linear distance in which the shaft of the valve can extend (the stroke length), it is possible to vary the degree of occlusion from a single valve. The solenoid valves on both lines (see elements 13 and 14) serve to develop dynamic pressure and resistance in a controlled manner for the purpose of altering the flow profile ejected from the pump 2 through the main line (see element 13).

One line extending distally from the Y-connection 15 will serve as the main line 13, and will be referred to as such. The second fluid line distal from the Y-connection 15 will serve as a control line for modification of the pressures and waveforms generated in the main line 13. The second line will be referred to as the parallel line 14. The parallel line 14 may serve dual purposes for the circuit as a whole. The first use of the parallel line 14 is for modification of waveforms by adjusting pressure of the fluid at the Y-connection 15. For example, if the parallel line 14 becomes fully occluded, the fluid ejected from the pump 2 is carried through the main line 13 exclusively, as opposed to traveling through both the main and parallel line 13, 14. The result is a faster, more voluminous wave carried through the main line 13. The second function of the parallel line 14 is to act as an overflow. When adjusting the resistance of the main line 13 (discussed below, see proportional valve 5), increased resistance causes a larger pressure head to form at the valve 3, 5 interface. By allowing the excess pressure and mass to be ejected through the parallel line 14, total system pressure is conserved from scenario to scenario.

In addition to the solenoid valves on both the main and parallel lines 13, 14, an embodiment of the present invention includes current dependent electrically operated valves, commonly referred to as "proportional valves" 5 in the industry. These valves 5 serve to modulate the static resistance to flow through each line 13, 14. The main fluid line 13 exits the waveform generator and connects to the fluid lines included in the anatomical unit. The fluid can thus pass through the simulated anatomy and return to the waveform generator to connect with the reservoir 1, which forms a complete fluid flow circuit. The parallel line 14 will return directly to the reservoir 1, remaining inside the waveform generator and also completing a closed circuit.

In an embodiment of the present invention, each mechanical element of the parallel drive system and the fluid pump itself are under the control of a programmable circuit board 24. The circuit board 24 is used to control the mechanical elements 2, 3, 5 and regulate the power supplied to each device 2, 3, 5 individually based on user programmed settings. The features of the board 24 preferably include the ability to be programmed to run autonomously, the ability to switch direct current or alternating current to each device through a relay in a time dependent or repeatable sequence, and the ability to interface with external devices for the purpose of remote control or remote programming. By programming the circuit board 24 to switch each device 2, 3, 5 on or off in precise sequential timing, various waveforms can be generated depending on the timing sequence used.

An embodiment of the present invention preferably includes a complete flow circuit comprised of the elements described above. However, the technology described can be adapted for different embodiments of the present invention to form multiple complete flow circuits operating simultaneously. Adding additional units that include these elements creates the ability to operate at least two functional flow circuits from one pump 2. Such a configuration is useful for symmetry studies including, but not limited to: stenosed carotid arterial studies, testicular and ovarian studies, limb symmetry studies, renal function studies, lung perfusion studies, and any other study of symmetrically functioning anatomies.

Figure 2:
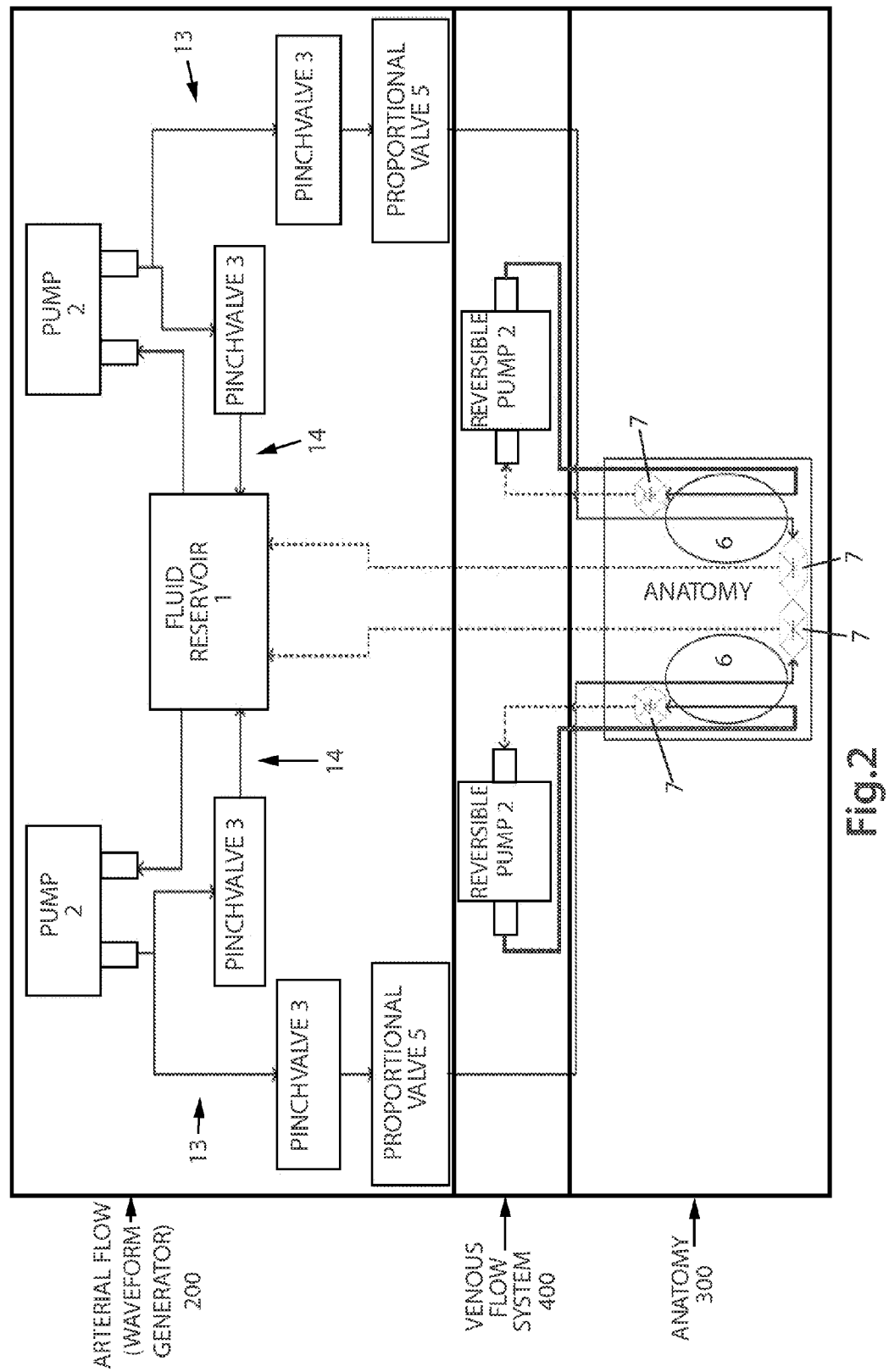
FIG. 2 is a flow diagram of a testicular torsion simulation device according to an embodiment of the present invention.
Figure 3:
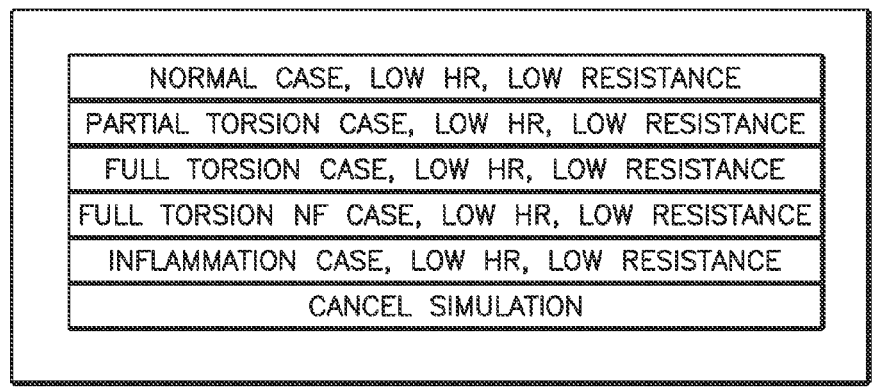
FIG. 3 is a wireframe of a user interface according to an embodiment of the present invention.
Figure 4:
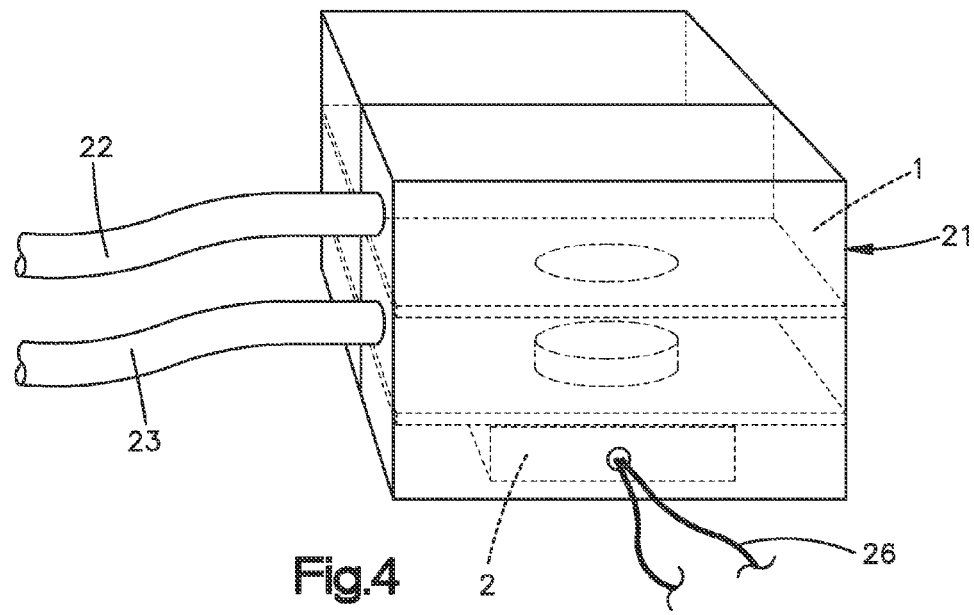
FIG. 4 is a side view of a portion of a waveform generator according to an embodiment of the present invention.

The simulation device 100 or portions of the simulation device 100 are depicted in FIGS. 1-9. Specifically, FIG. 1 depicts a flow diagram of a simulation device 100 according to an embodiment of the present invention where the simulation device 100 is a testicular torsion simulation device. Although FIG. 1 depicts a testicular torsion simulation device, one skilled in the art will readily understand that the anatomical unit 6 shown in FIG. 1 may be another portion of the anatomy. As shown in FIG. 1, there are three main portions of the simulation device 100 according to a preferred embodiment of the present invention: an arterial flow portion 200, an anatomy portion 300, and a venous flow portion 400. In a preferred embodiment of the present invention, the arterial flow portion 200 of the device 100 includes a fluid reservoir 1, a pump 2, and valves (as shown in FIG. 1, the valves preferable include pinch valves 3 and a proportional valve 5). The device 100 preferably includes dual fluid lines—a main line 13 and a parallel line 14, which are split at a bifurcation point using a y-connection 15. The valves shown in FIG. 1 are solenoid valves in a preferred embodiment of the present invention, but one of ordinary skill in the art will understand that the valves may be other types of valves known in the art or that will become known in the art. Additionally, the bifurcation point uses a y-connection 15 in a preferred embodiment of the present invention, but one of ordinary skill in the art will understand that any fitting capable of splitting one line into at least two lines may be used. In general, the arterial flow portion 200 comprises the waveform generator as described herein. The waveform generator may be a separate element disposed in its own housing as shown in FIGS. 4-6.

In a preferred embodiment of the present invention, the anatomy portion 300 of the device 100 includes an anatomical unit 6 and air pockets 7. In an embodiment of the present invention, the ultrasound active region 16 includes the anatomical unit 6. FIG. 1 includes an example of an artery 17 and a vein 18 that run through the anatomical unit 6. The anatomical unit 6 includes a housing, which may mimic a portion of the anatomy of a human or other animal. The housing can connect to fluid lines external to the housing. The housing may be comprised of, for example, silicone, latex, rubber, soft rubber composite, or similar. In a preferred embodiment of the present invention, an ultrasound device 12 is used to view the ultrasound active region 16. Specifically, the ultrasound device 12 is used to view waveforms generated in the ultrasound active region 16.

In a preferred embodiment of the present invention, the venous flow portion 400 of the device 100 includes a reversible pump 8, which may be in the form of a positive displacement electric fluid pump. The venous flow portion 400 further includes a fluid reservoir 1. The venous flow portion 400 creates a different type of waveform through the anatomical unit 6 than the waveform through the arterial flow portion 200 (the venous flow portion 400 simulates a vein 18 while the arterial flow portion 200 simulates an artery 17). In a preferred embodiment of the present invention, the arterial flow waveform is pulsating while the venous flow waveform is undulating. The arterial flow and venous flow may run through the anatomical unit 6 simultaneously in a sequence in order to simulate blood flow. The arterial flow and venous flow may be harmonious to one another. The arterial flow and venous flow may travel through the anatomical unit 6 in the same direction or in opposite directions. An embodiment of the present invention is also able to simulate venous flow that accounts for respiratory variations (breathing) and cardiac phasicity and pulsatility that causes a very gentle low pressure wave which is distinctive and is at times diagnostic of certain illnesses.

The solenoid valves included in the device 100 are controlled through transistor circuits 10 using a microcontroller 9. As shown in FIG. 1, the microcontroller 9 is a programmable circuit board that enables the generation of waveforms through the control of the components on the main 13 and parallel 14 lines. In a preferred embodiment of the present invention, the microcontroller 9 is controlled by an application 11 on an Android device (or similar) via Bluetooth (or similar). Thus, the microcontroller 9 may function in conjunction with a Bluetooth chip 19. The application 11 preferably includes a user interface 20 that allows a user to control the simulation device 100.

The microcontroller 9 controls a sequence of events in order to create waveforms that simulate blood flow (arterial and venous). The circuit board 24 in a preferred embodiment of the present invention is printed such that it has a Bluetooth device or similar that connects to a device that includes the application 11 (e.g., an Android device). Thus, the application 11 resides on the Android device or similar, and the printed circuit board 24 includes the control sequence.

FIG. 2 depicts a flow diagram of a simulation device 100 according to an embodiment of the present invention, similar to FIG. 1, except that FIG. 2 depicts two anatomical units 6. In an embodiment of the present invention simulating testicular torsion, FIG. 1 depicts one testicle while FIG. 2 depicts two testicles. Therefore, FIG. 2 could be used to show normal flow through one testicle and a pathological condition through the other testicle so that observers can see the difference in flow conditions. For example, one testicle can simulate a torsion flow condition, while the other simulates a normal flow condition. In FIG. 2 the solid lines represent flow into the anatomical unit 6, while the dotted lines represent flow out of the anatomical unit 6.

FIG. 3 depicts an example of the user interface 20 of an embodiment of the present invention. Specifically, FIG. 3 shows five different scenarios that a user can choose to simulate: "Normal Case," "Partial Torsion Case," "Full Torsion Case," "Full Torsion NF Case," and "Inflammation Case." However, one skilled in the art will recognize that the user interface selections shown are in FIG. 3 for example only. In other words, there may be more conditions/cases to choose from, less conditions/cases to choose from, or different pathological conditions/cases to choose from. For example, a user interface 20 of an embodiment of the present invention includes modifiable heartrate (HR) and resistance.

FIG. 4 shows a portion of the waveform generator according to an embodiment of the present invention, and includes a housing 21 comprising a pump 2 and a reservoir 1 in combination. In an embodiment of the present invention, the pump 2 can be selected such that it creates a pressure head that allows for a pulsating wave, which has a high resistance to travel through a narrow space (i.e., artery 17 or vein 18). The tubing shown represents the inlet 22 and the outlet 23 to the housing 21. FIG. 4 also depicts control wiring 26. FIG. 5 depicts a close-up view of the housing 21 with the pump 2 and reservoir 1 in combination, and FIG. 6 depicts a rear view of same. As shown in FIG. 6, the housing 21 may include an additional pump and reservoir, for example, for simulating two anatomical units (e.g., two testicles).

Figure 7:
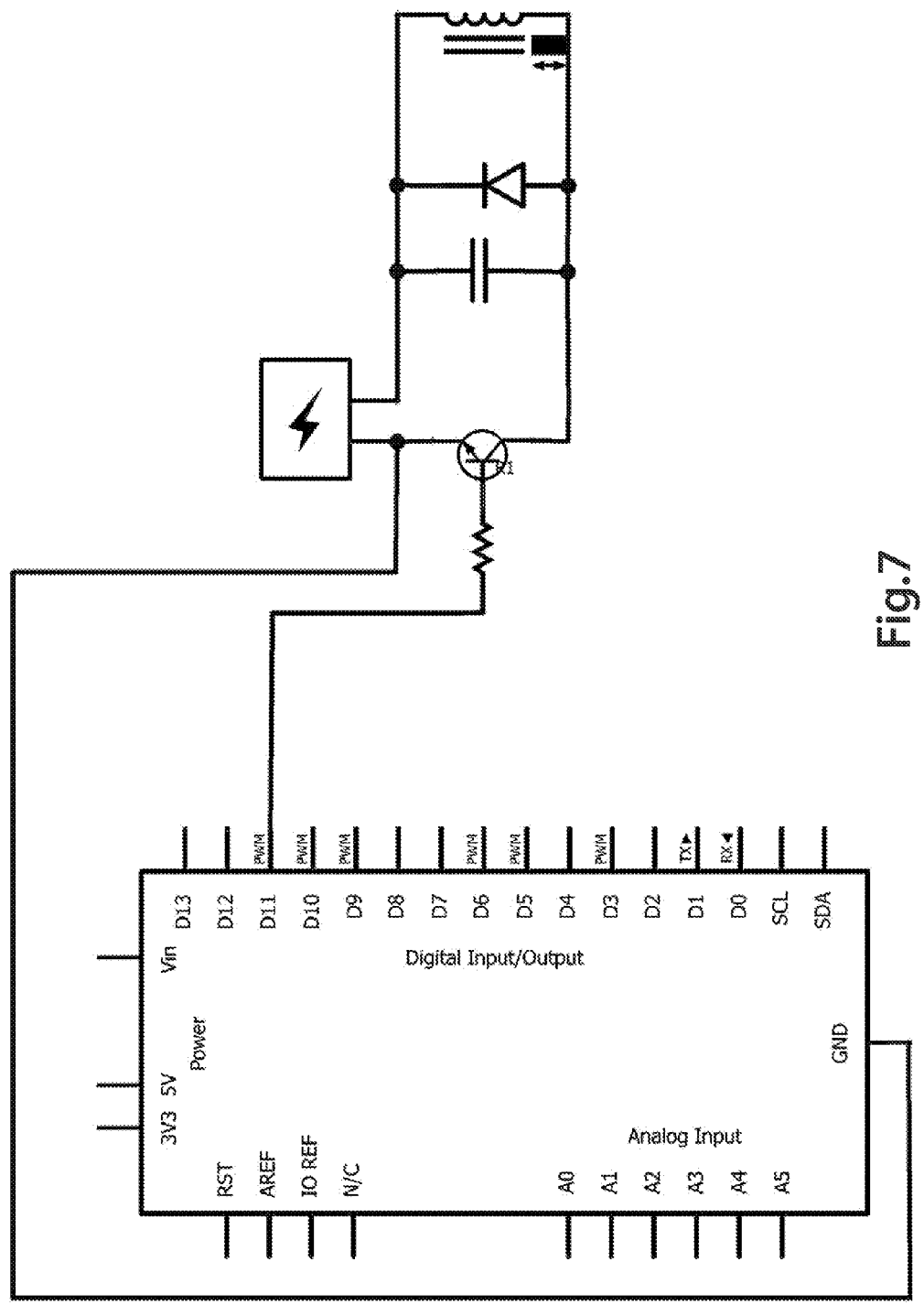
FIG. 7 is a circuit diagram of a control system for controlling the valves according to an embodiment of the present invention.
Figure 8:
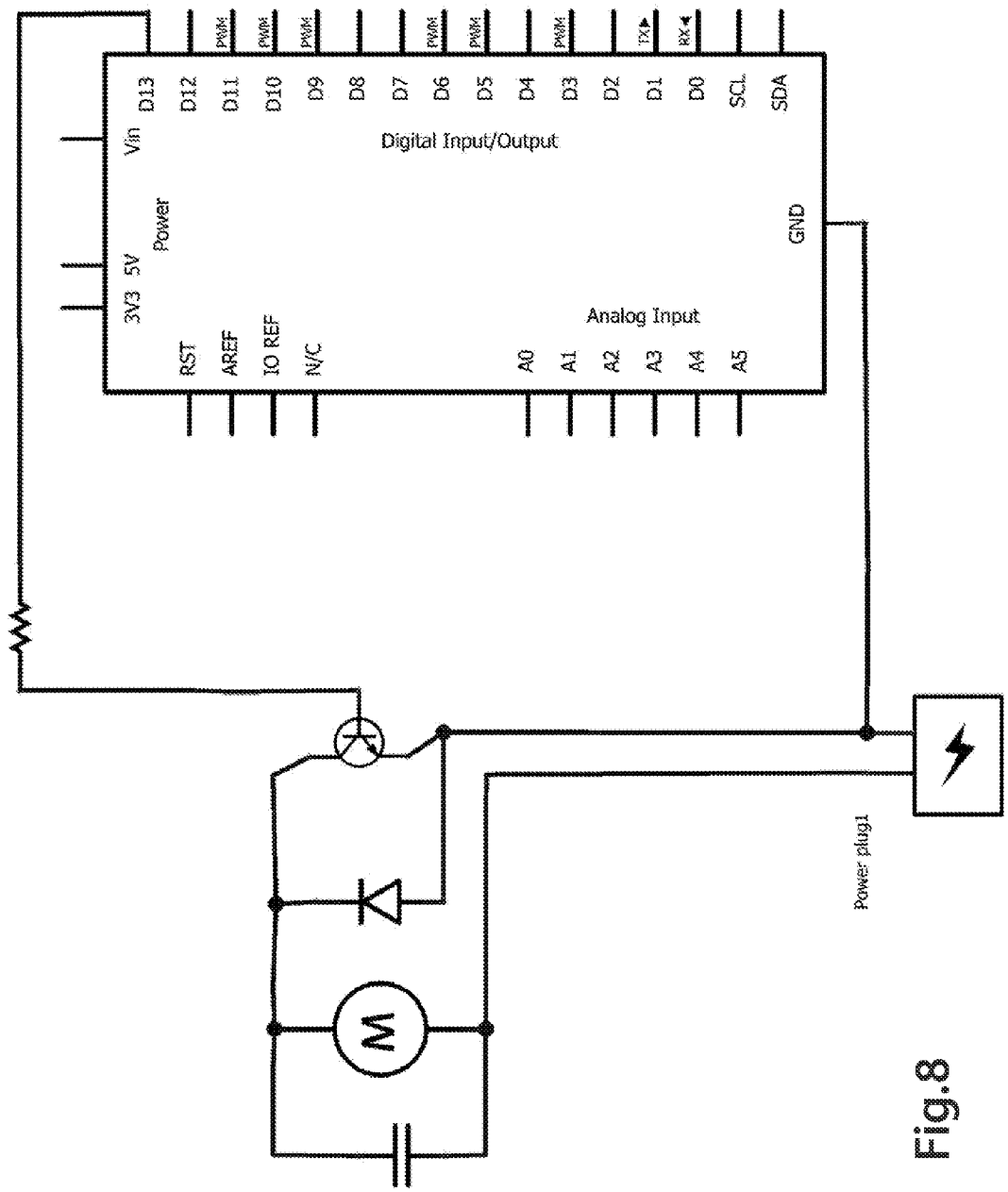
FIG. 8 is a circuit diagram of a control system for controlling the pump according to an embodiment of the present invention.
Figure 9:
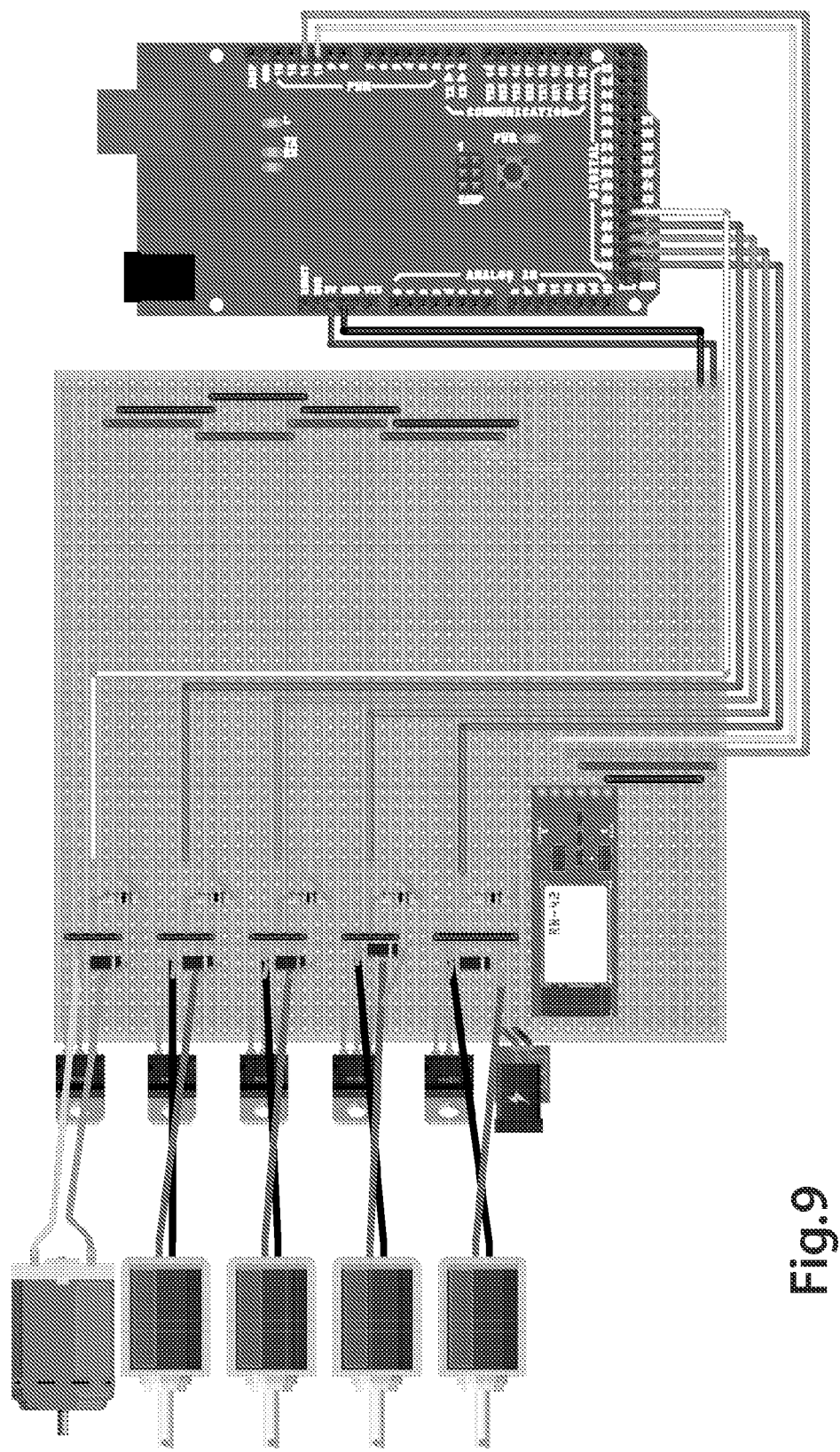
FIG. 9 is a circuit diagram of a control system according to an embodiment of the present invention.
Figure 10:
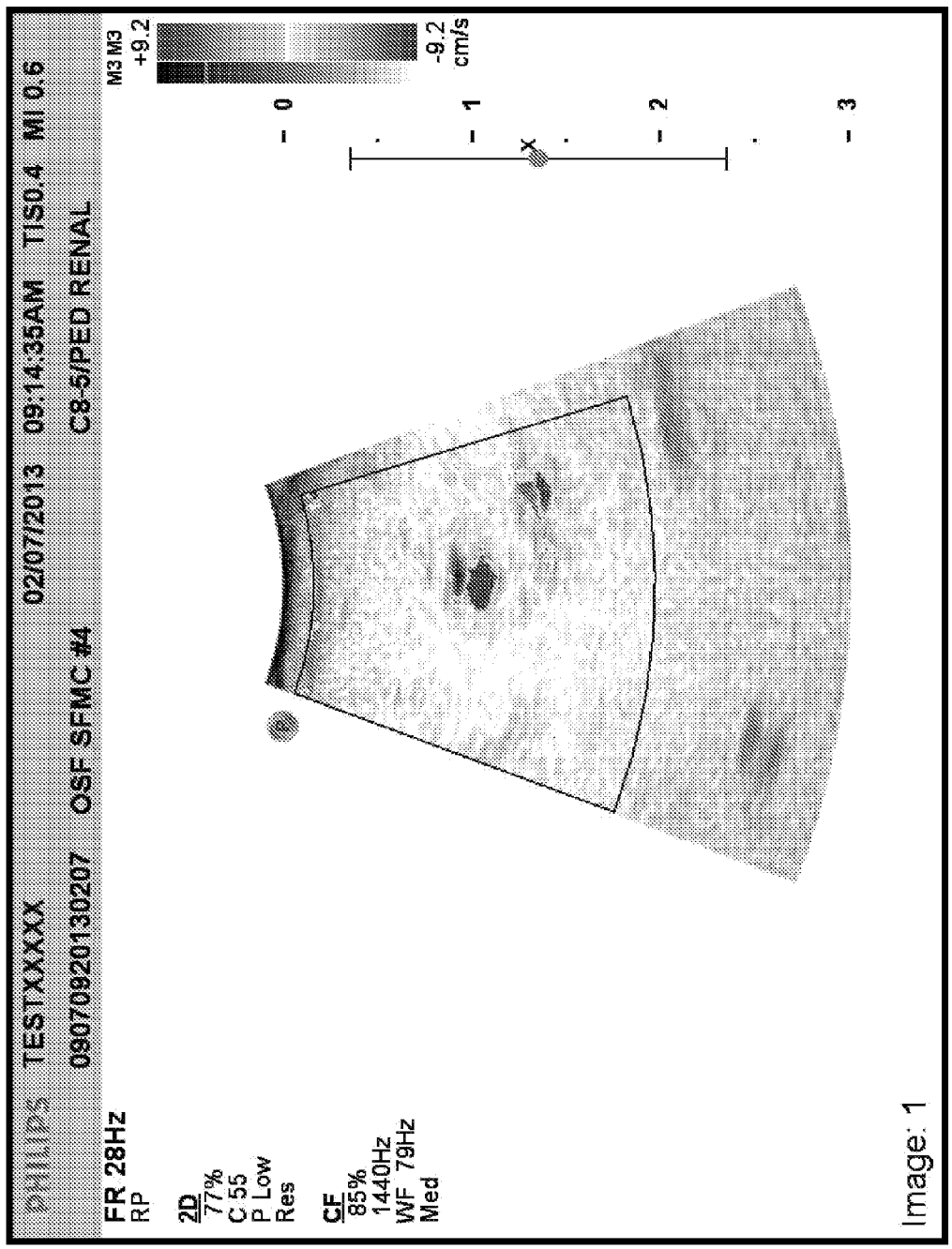
FIGS. 10-33 are images taken from an ultrasound test according to an embodiment of the present invention.
Figure 11:
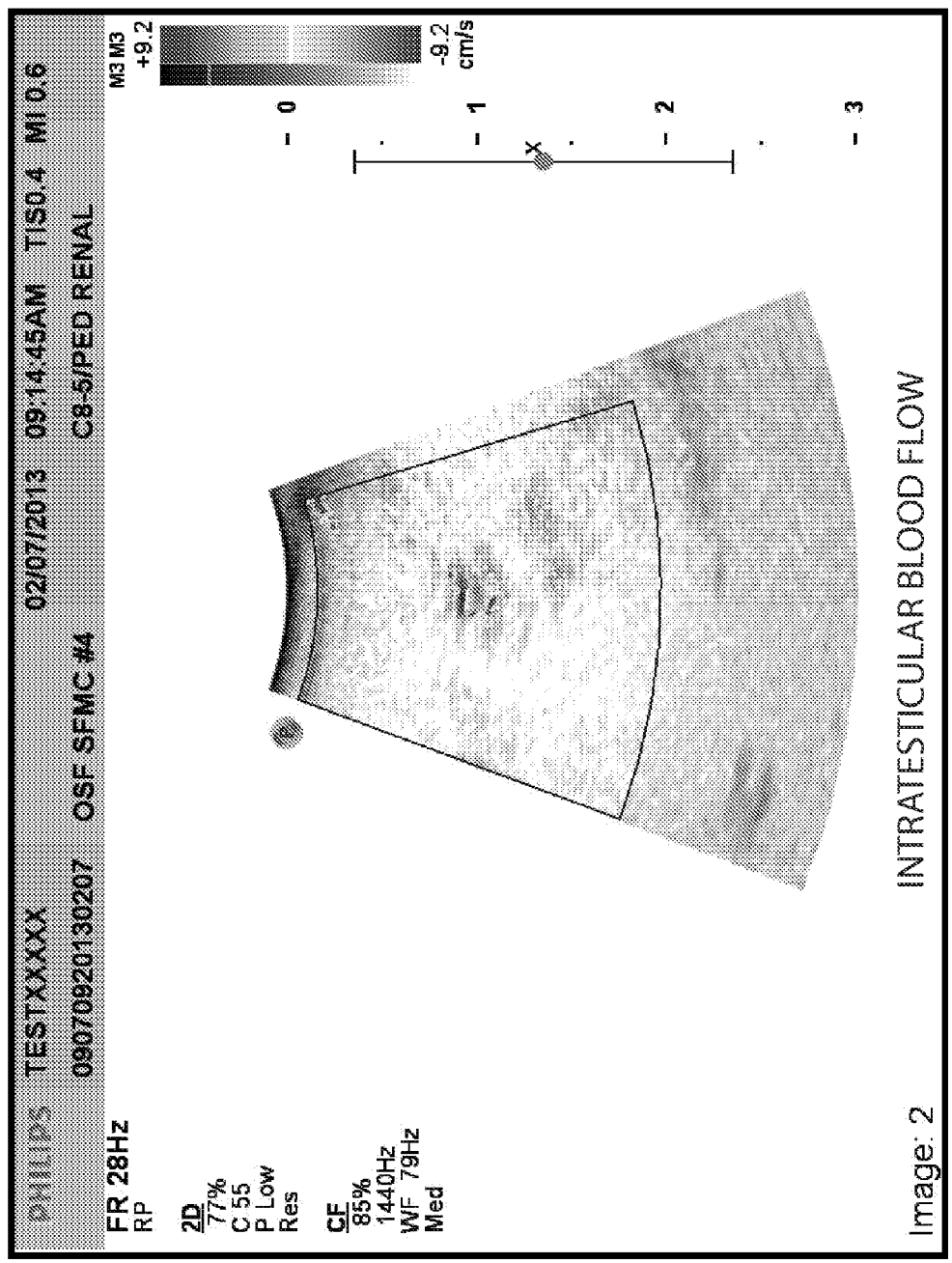
Figure 12:
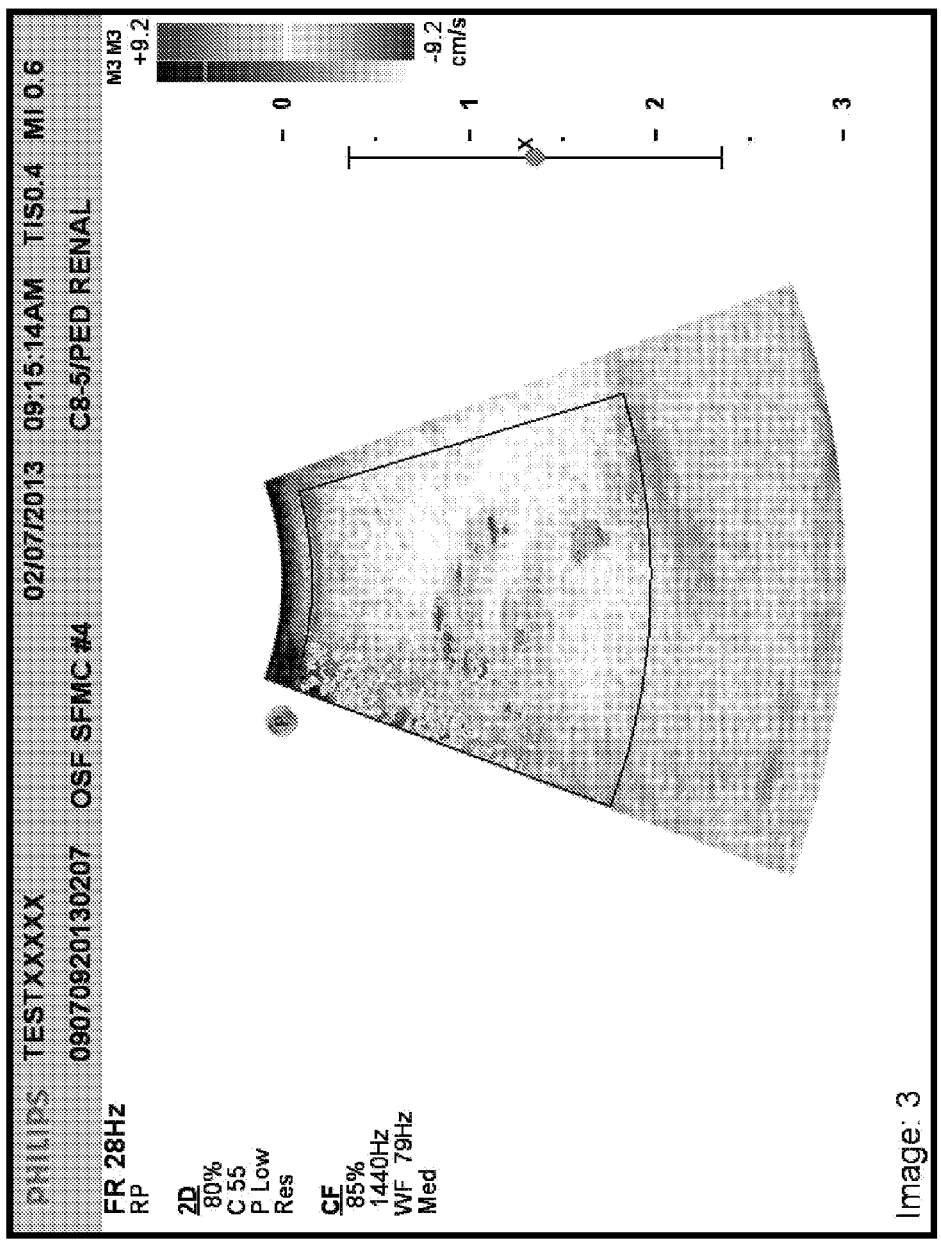
Figure 13:
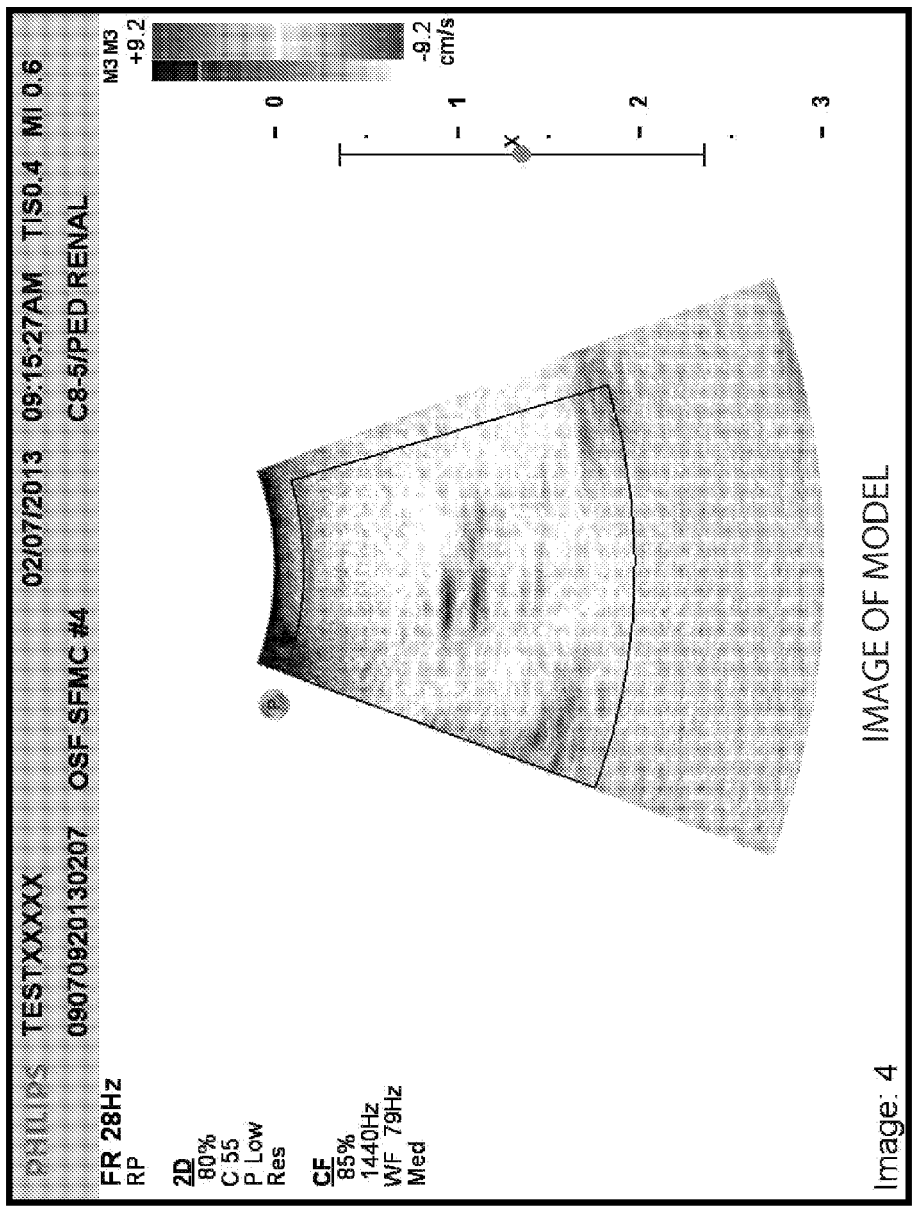
Figure 14:
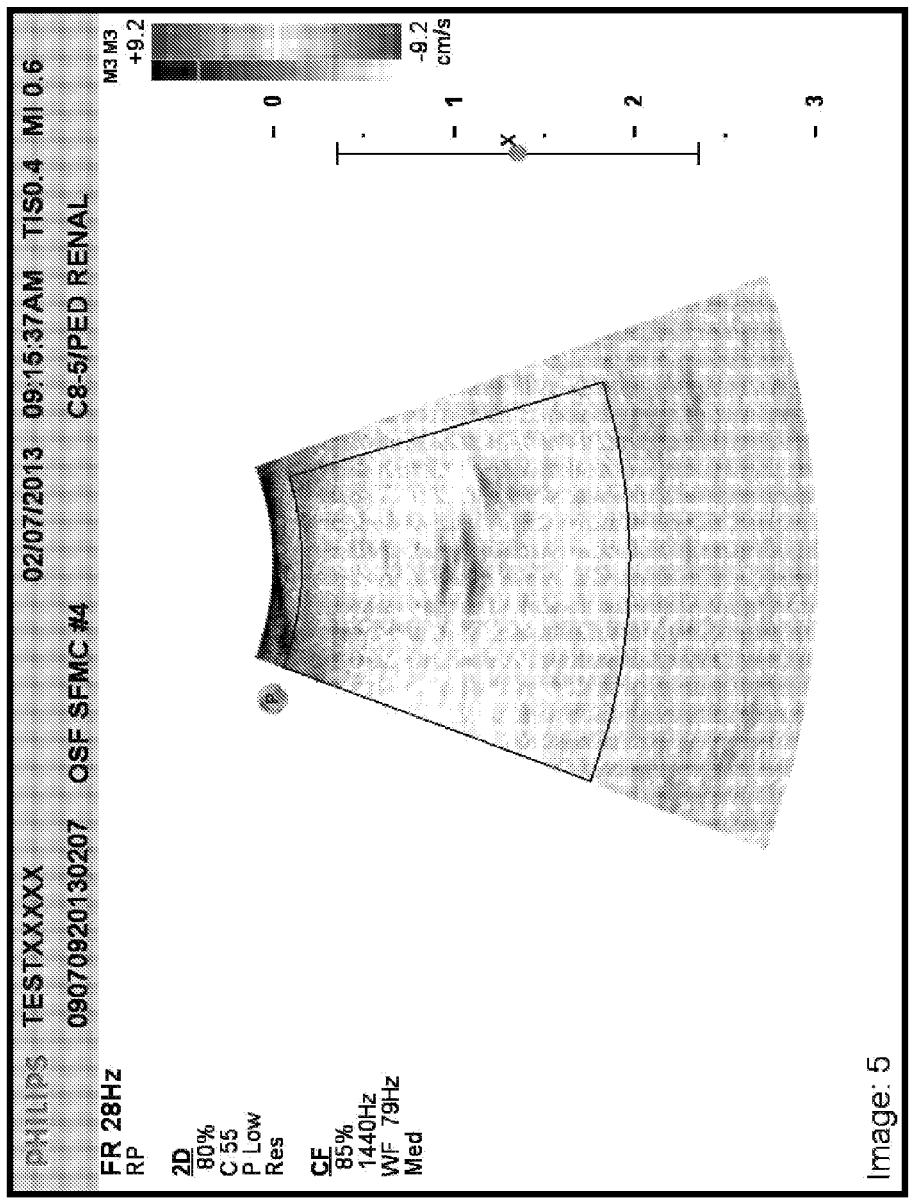
Figure 15:
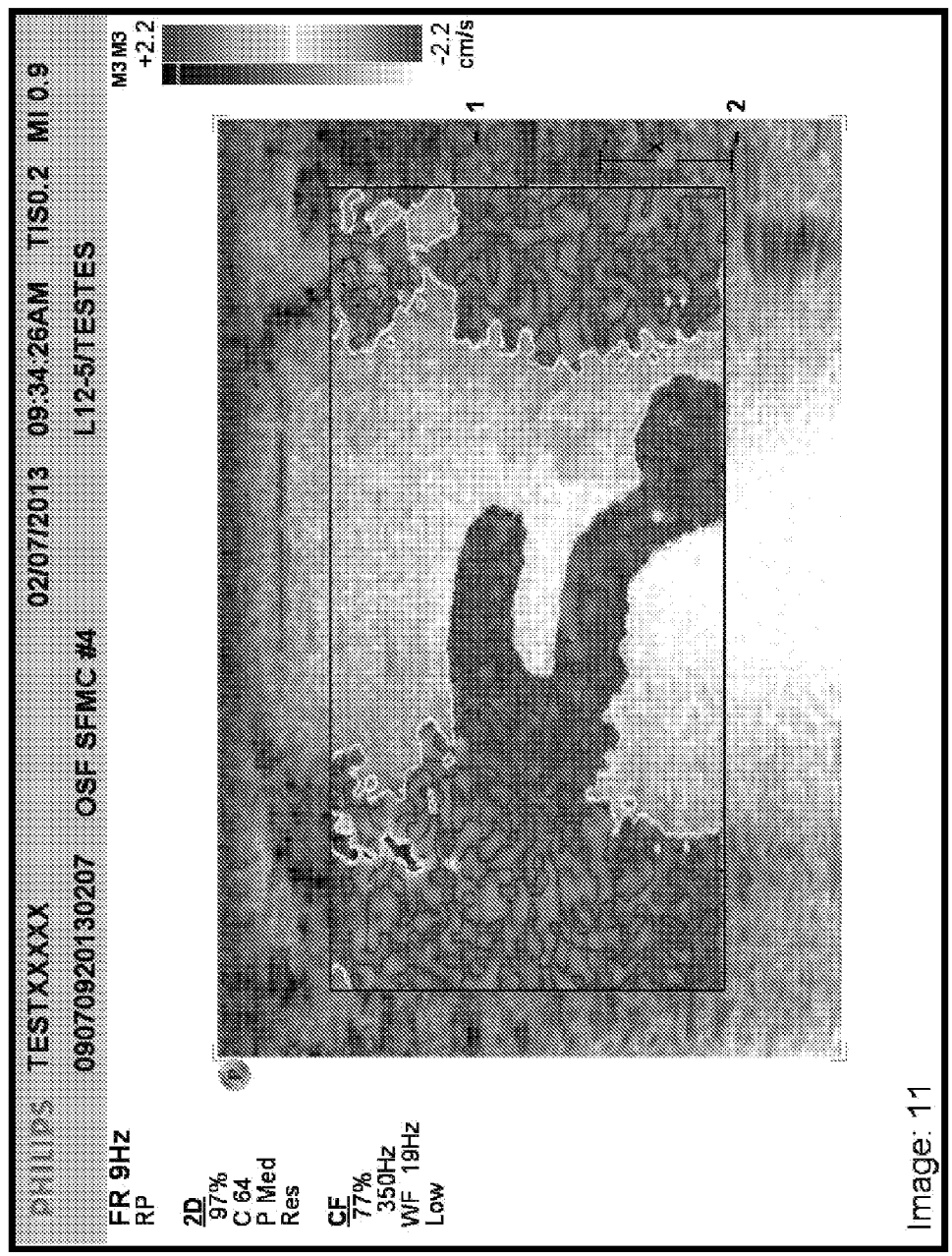
Figure 16:
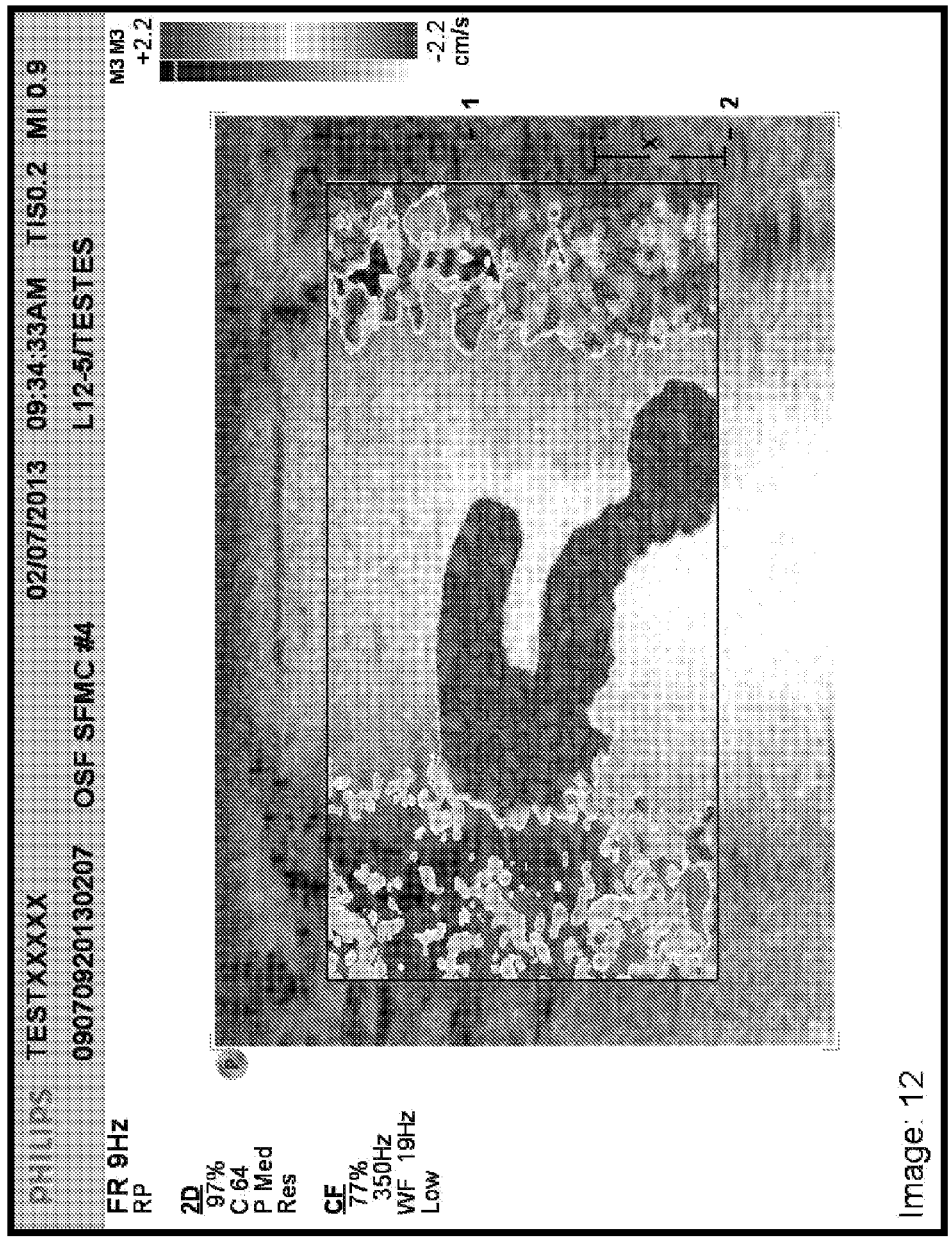
Figure 17:
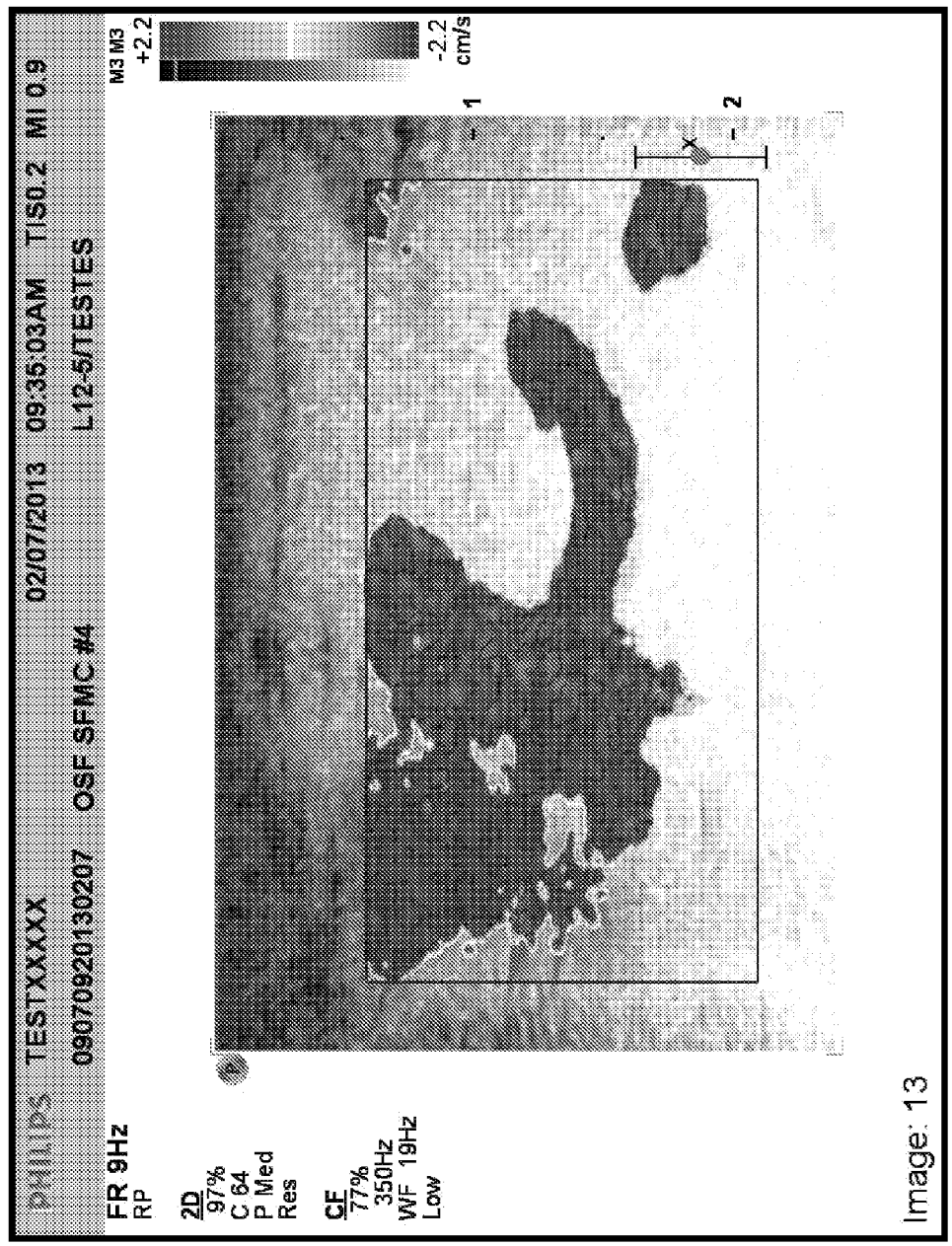
Figure 18:
Figure 19:
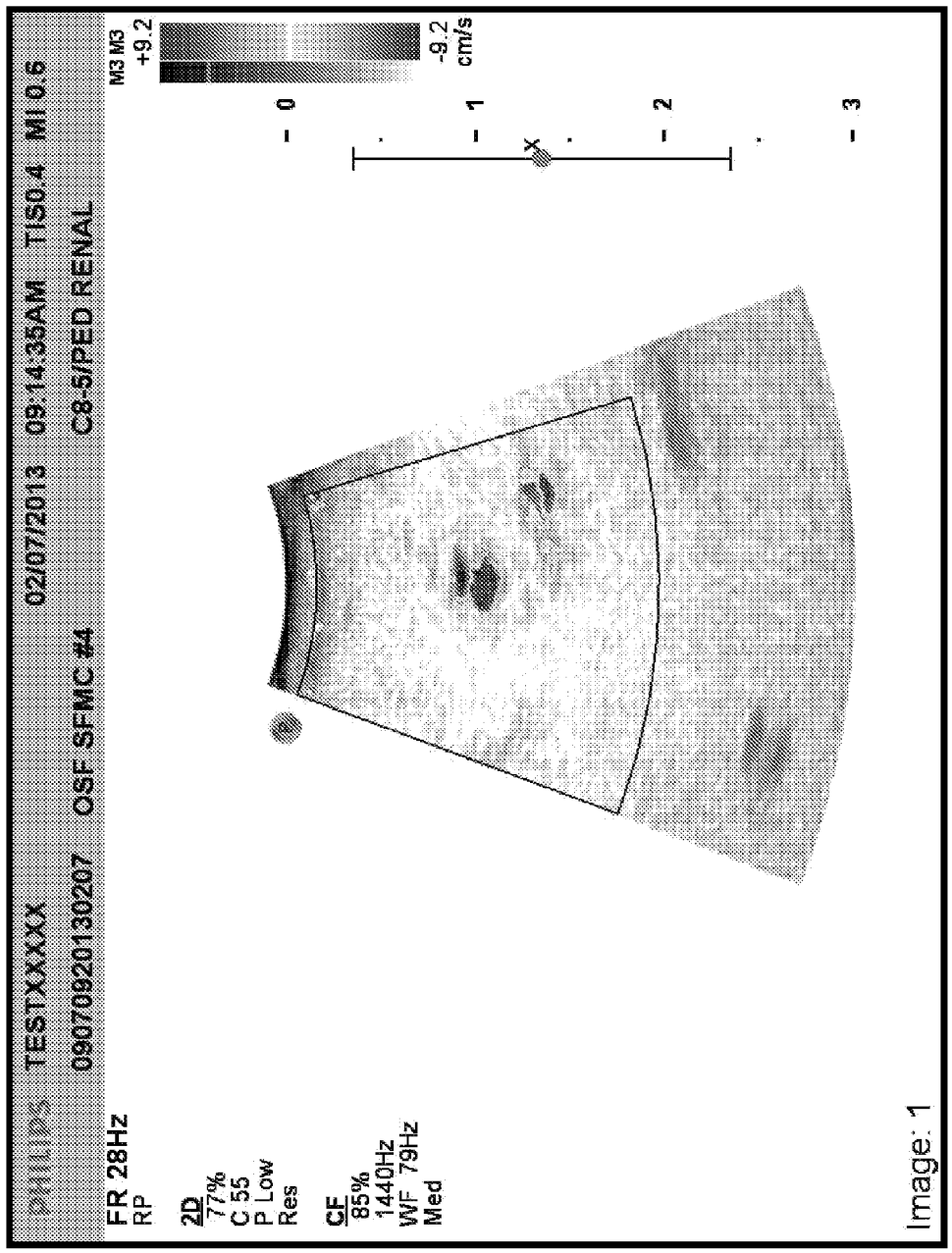
Figure 20:
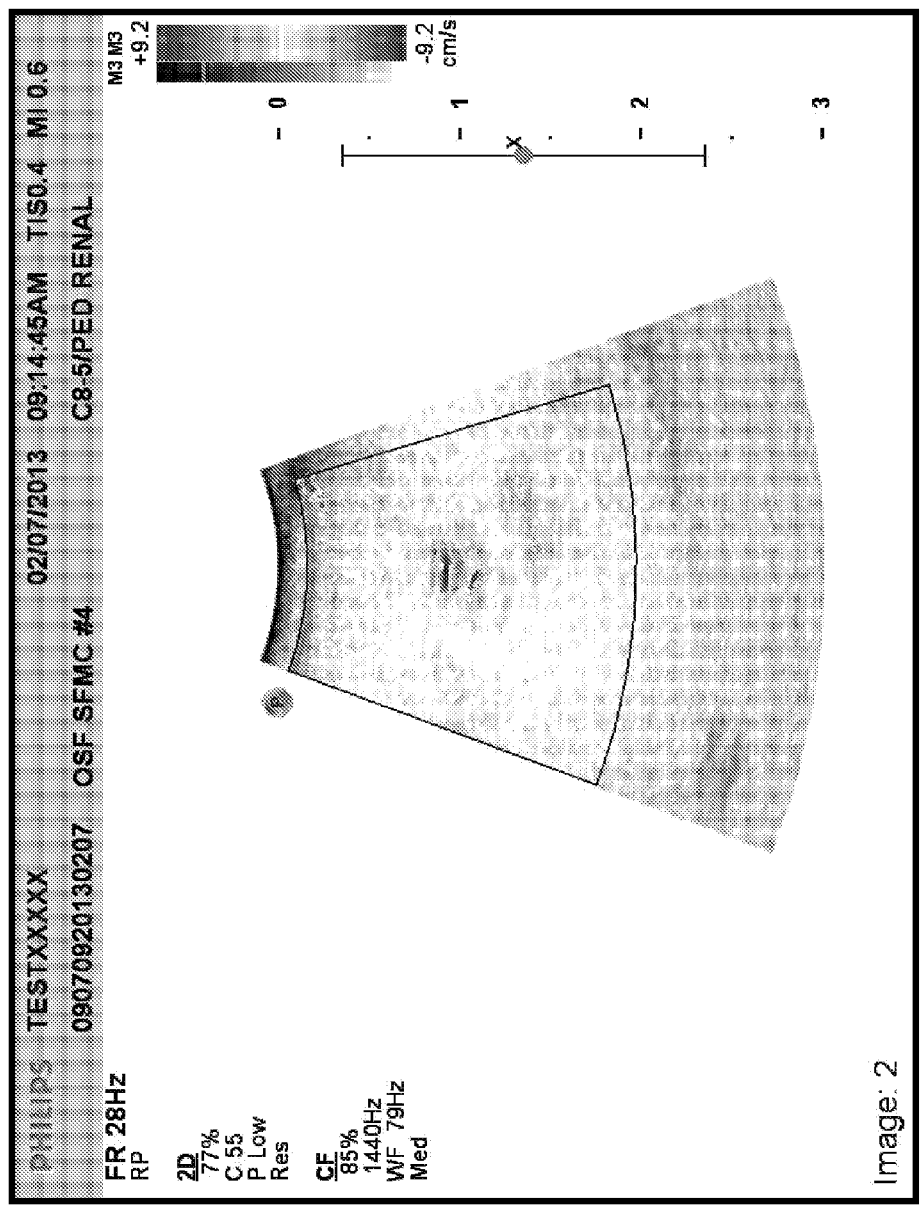
Figure 21:
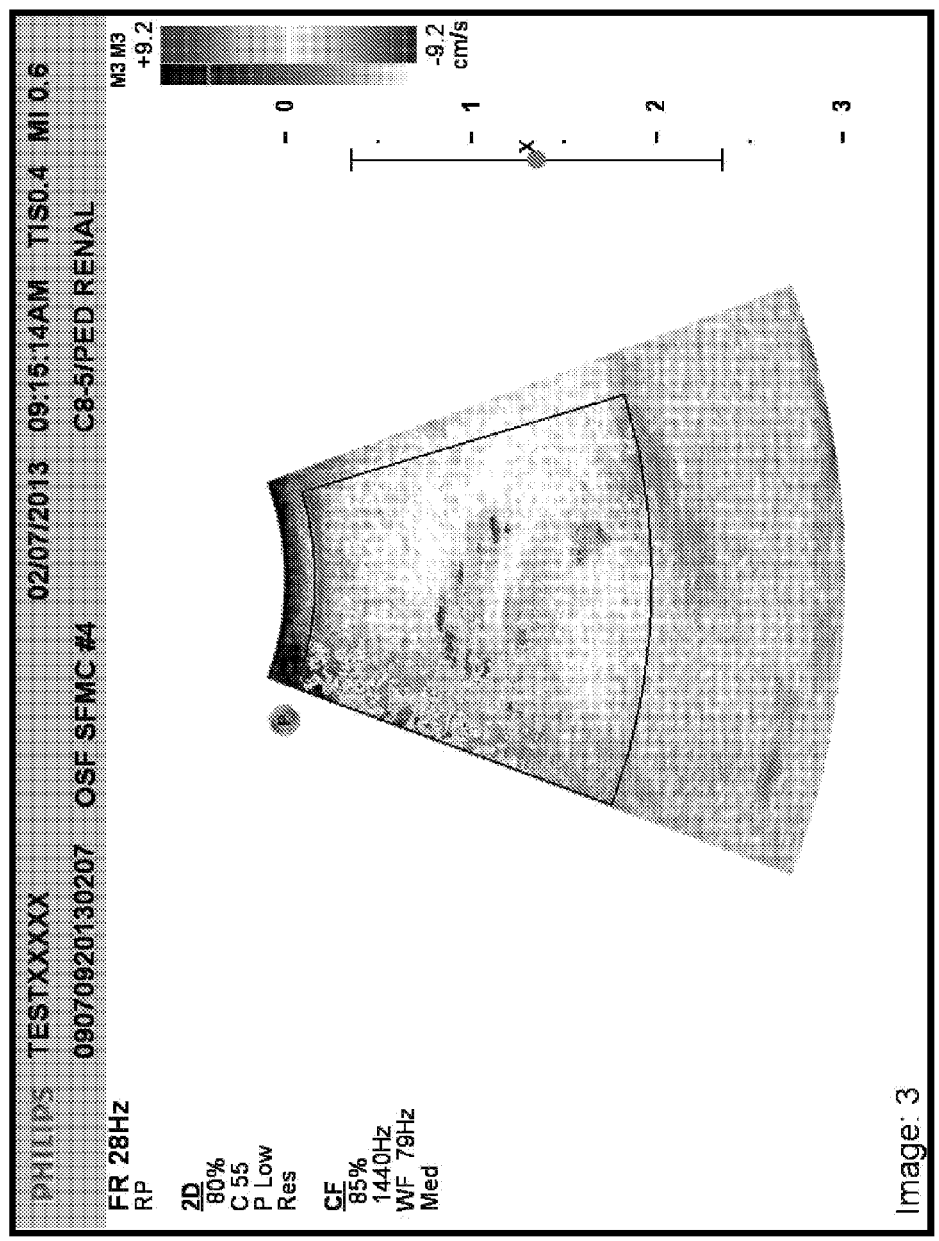
Figure 22:
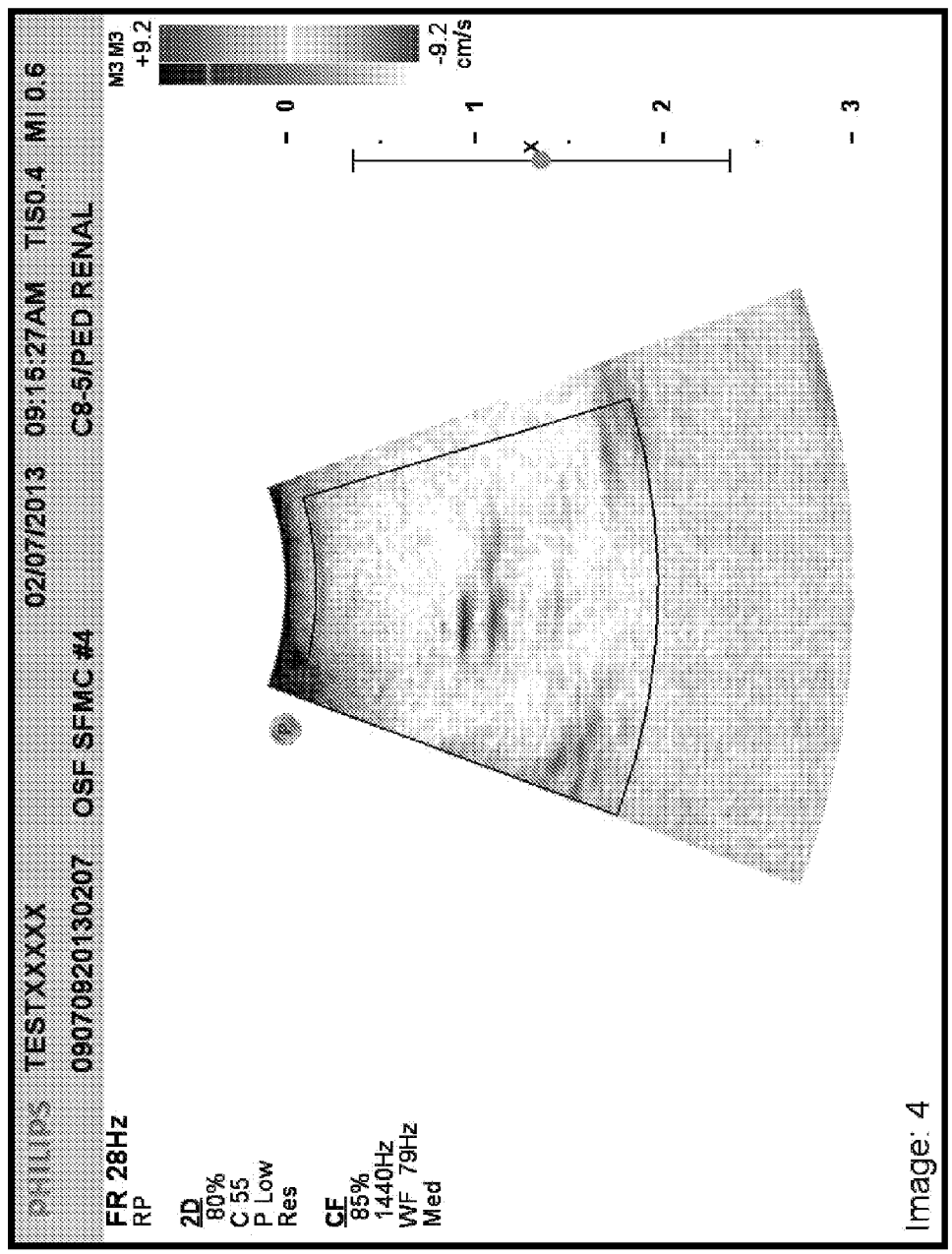
Figure 23:
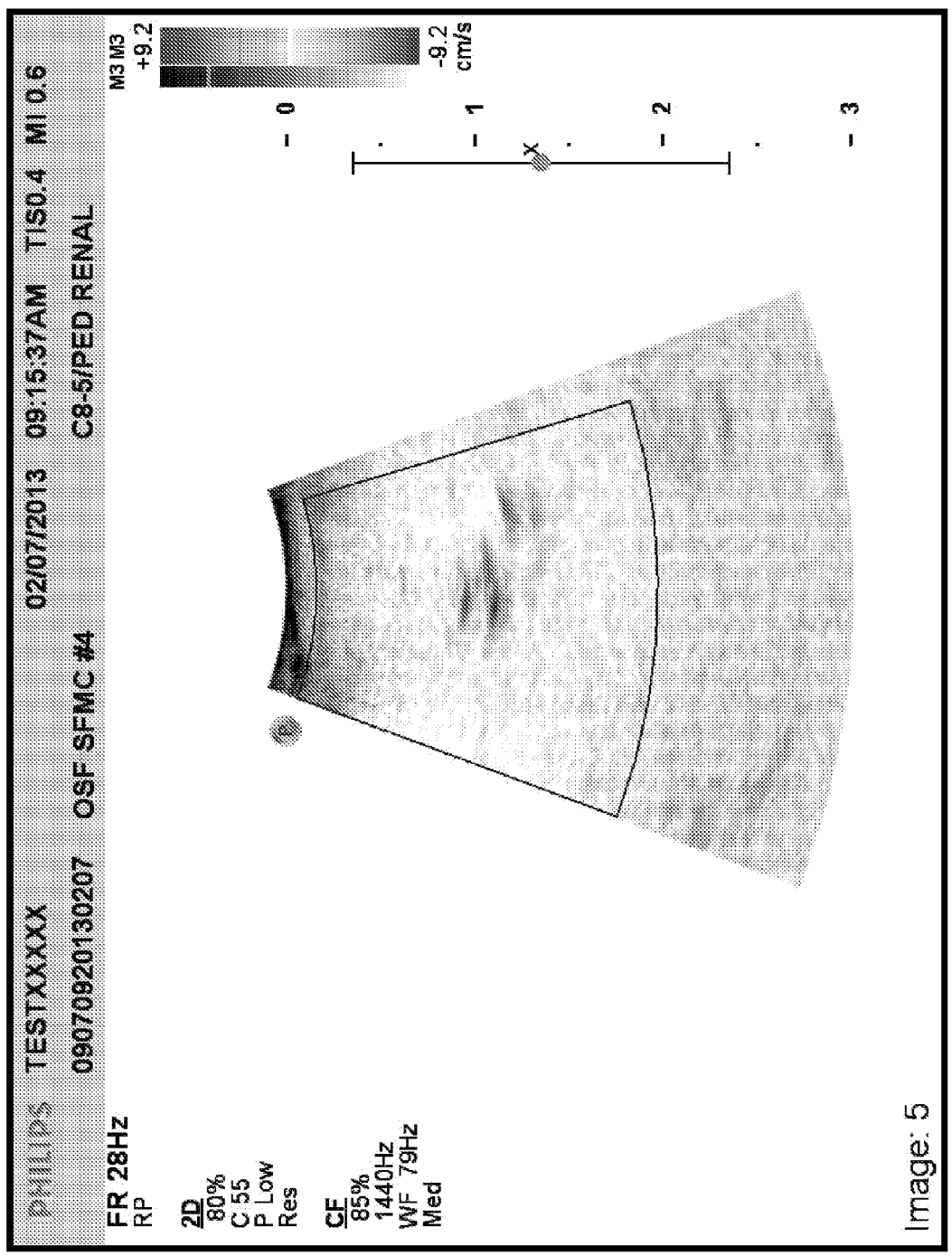
Figure 24:
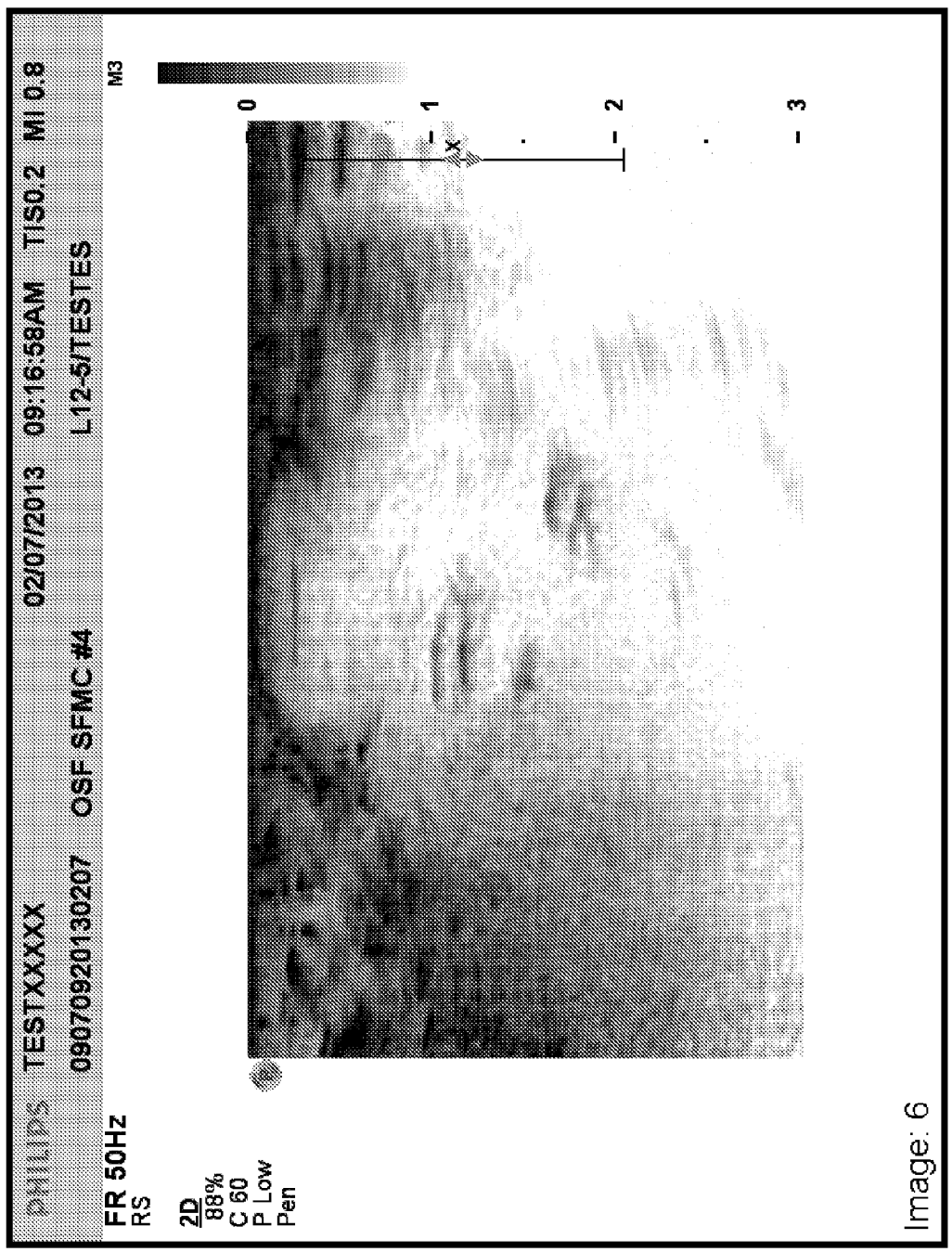
Figure 25:
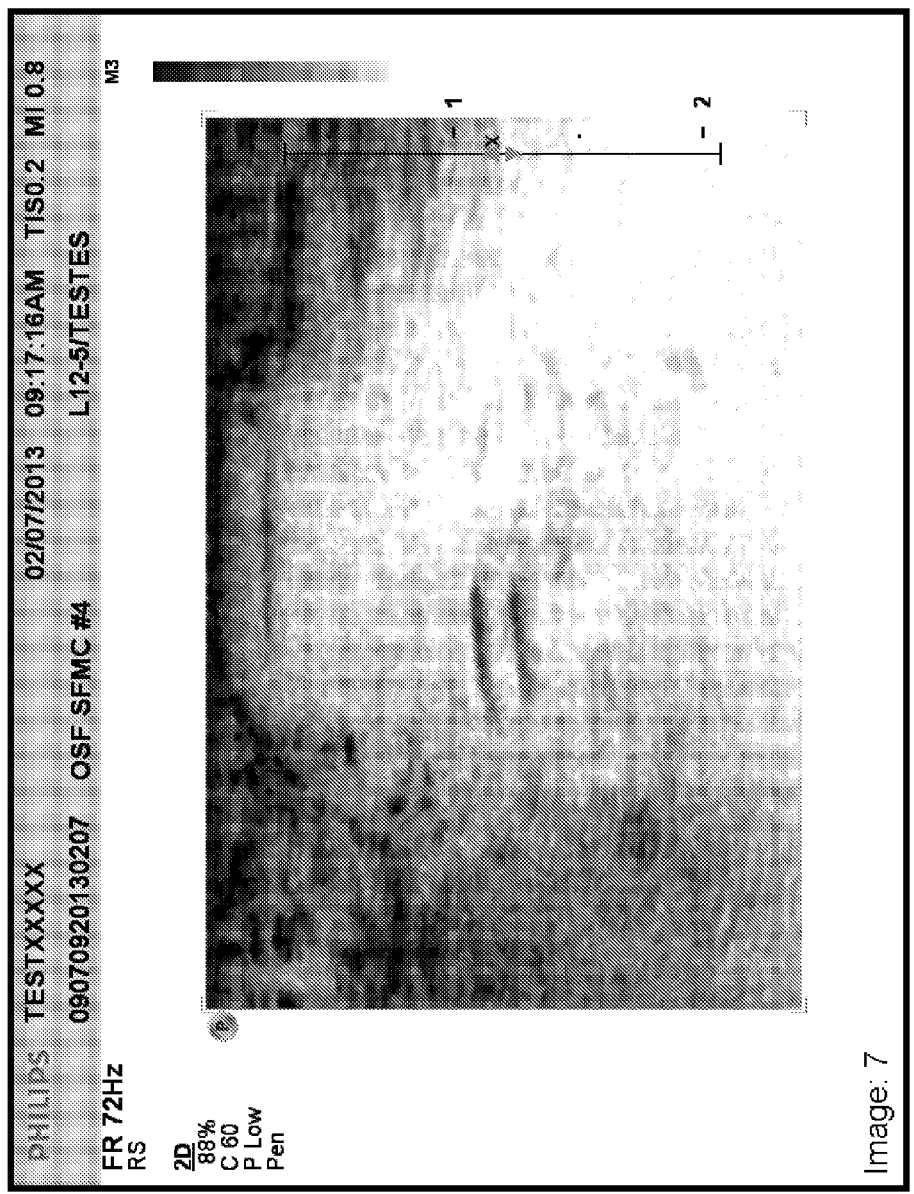
Figure 26:
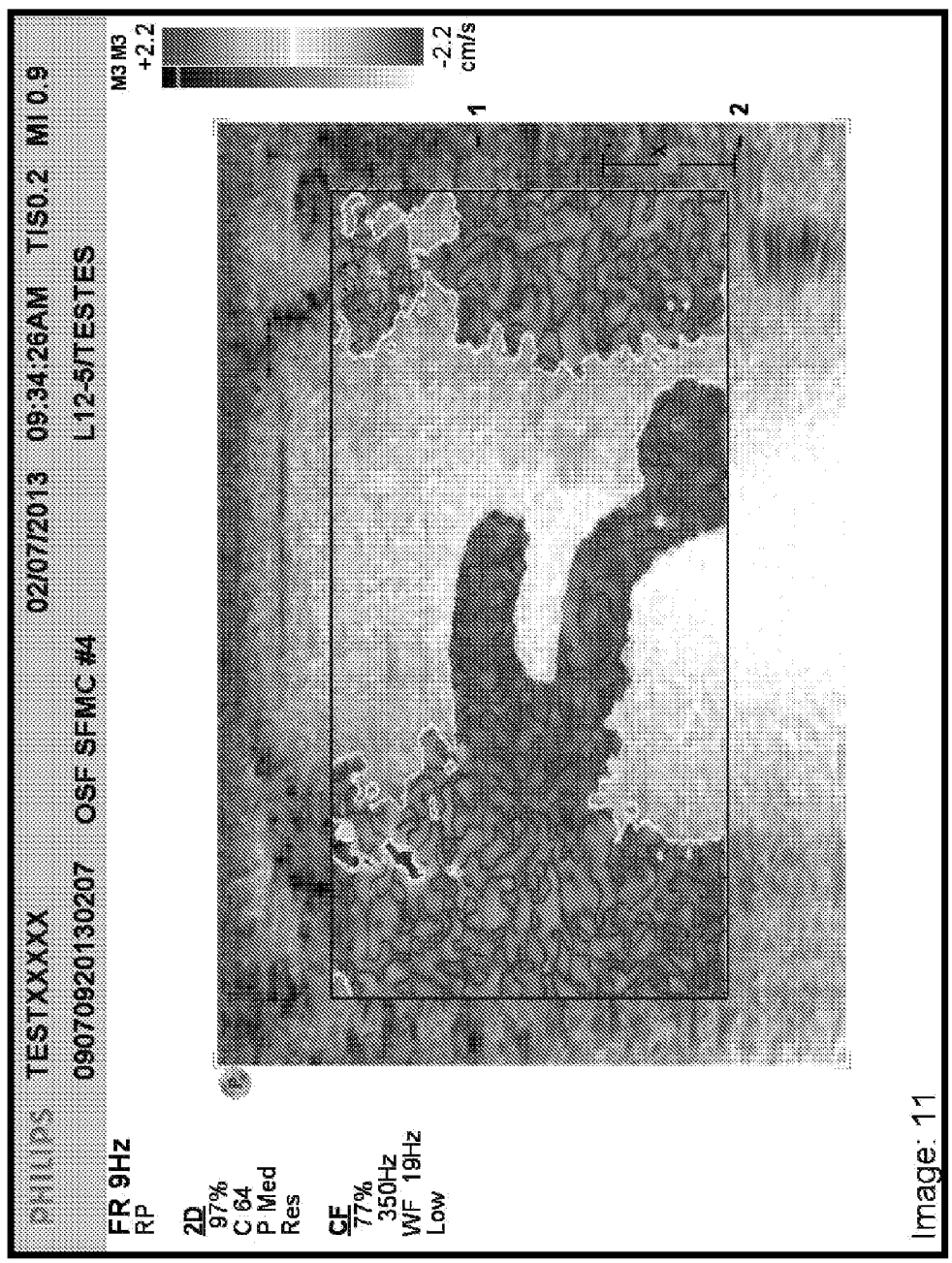
Figure 27:
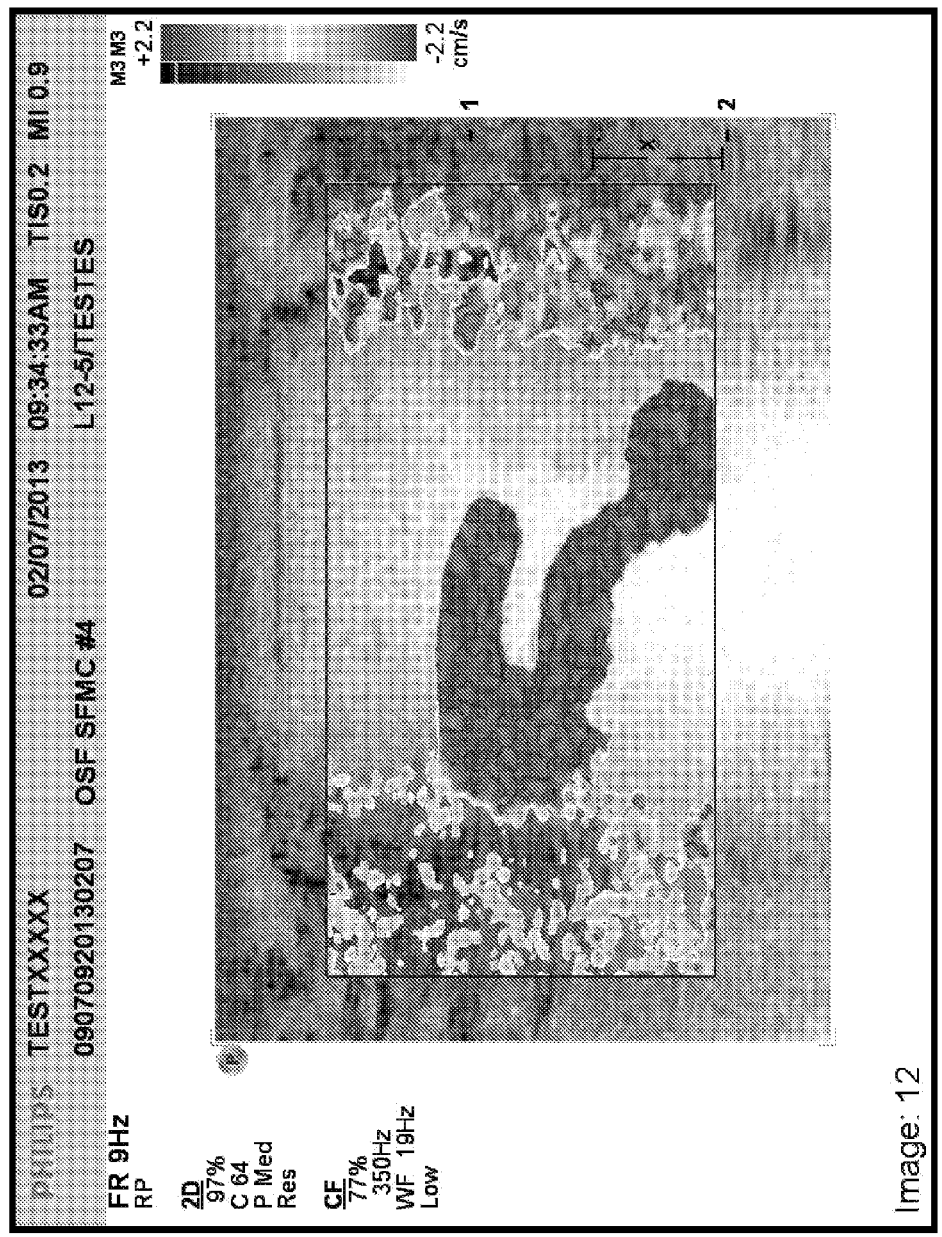
Figure 28:
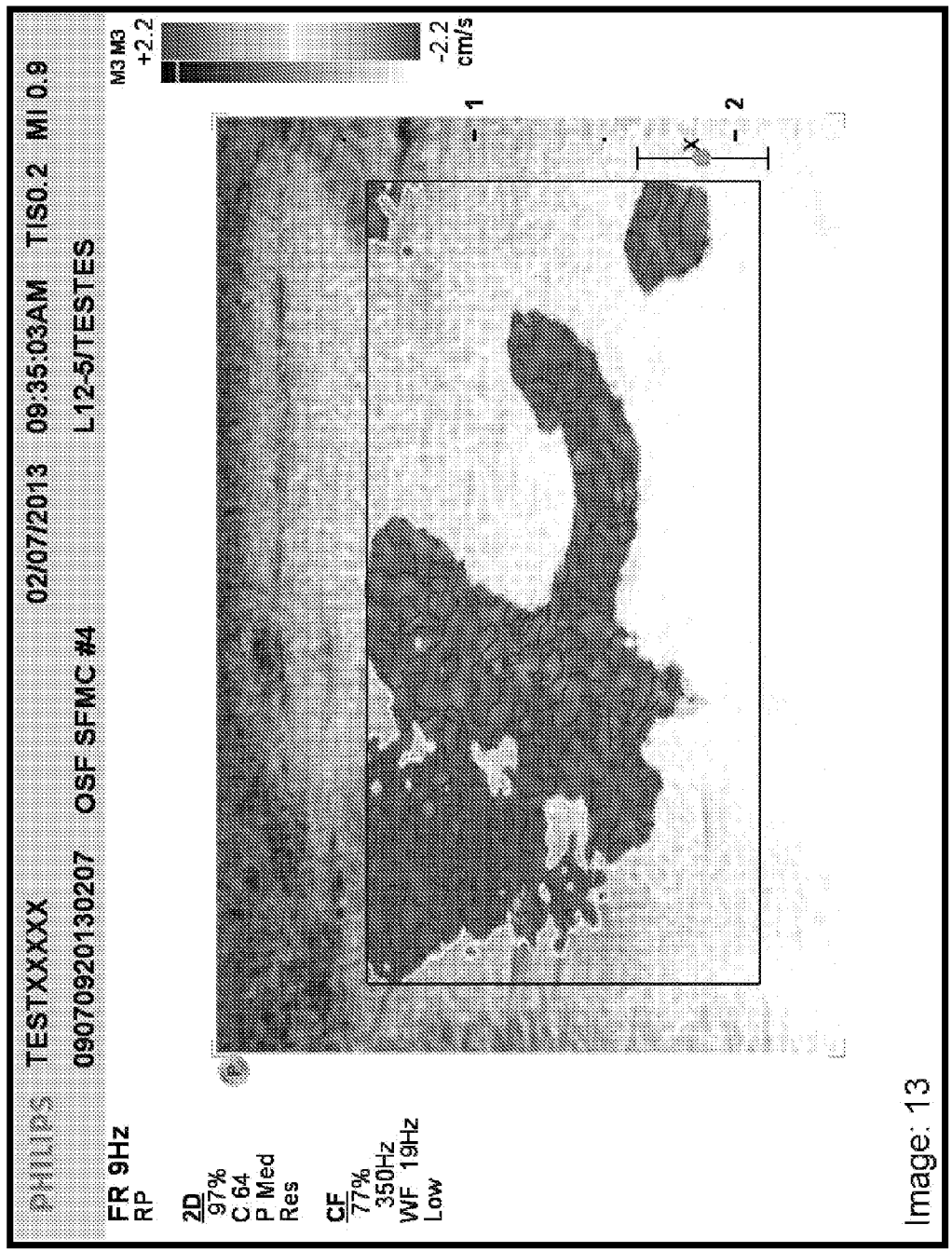
Figure 29:
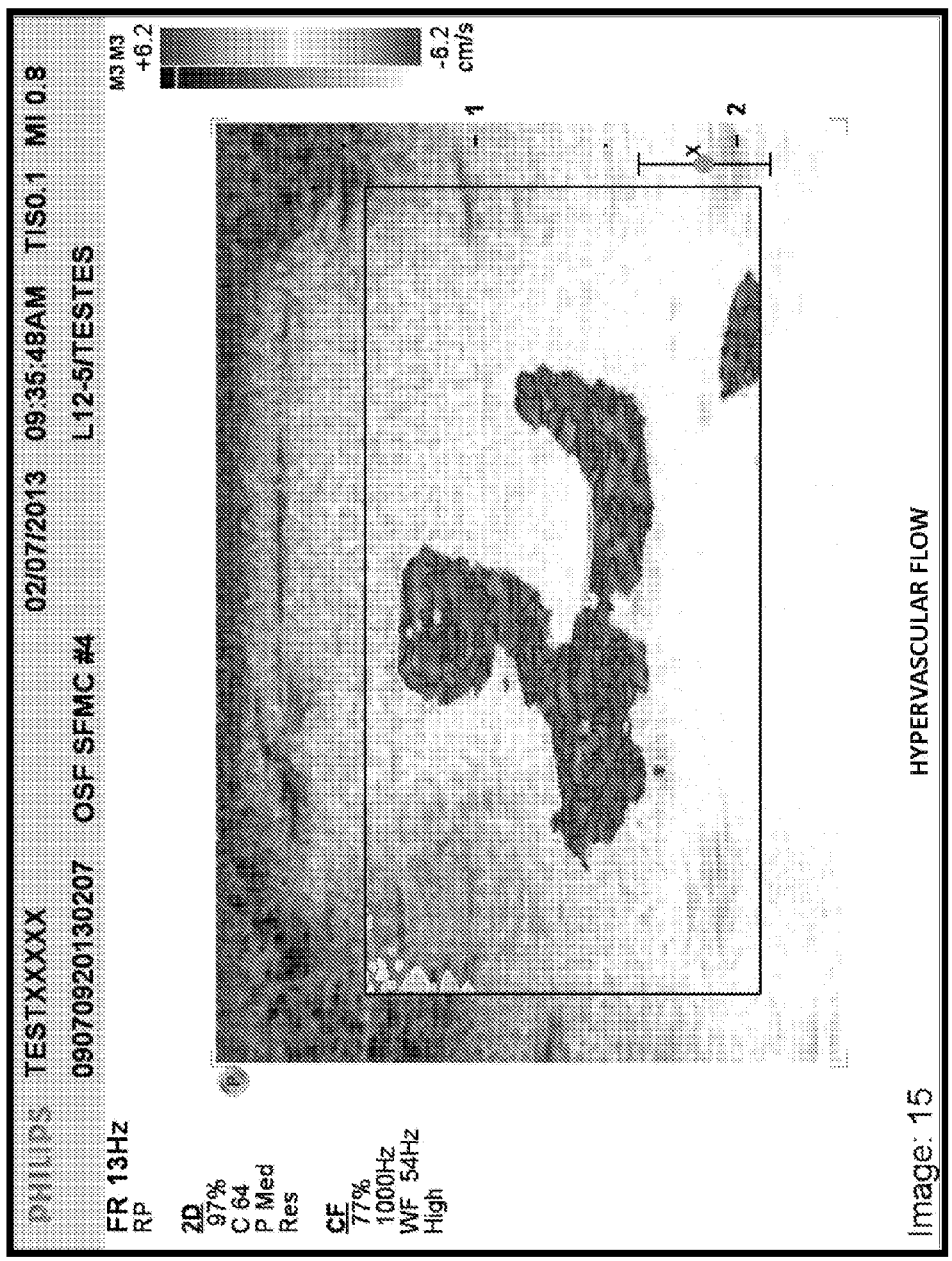
Figure 30:
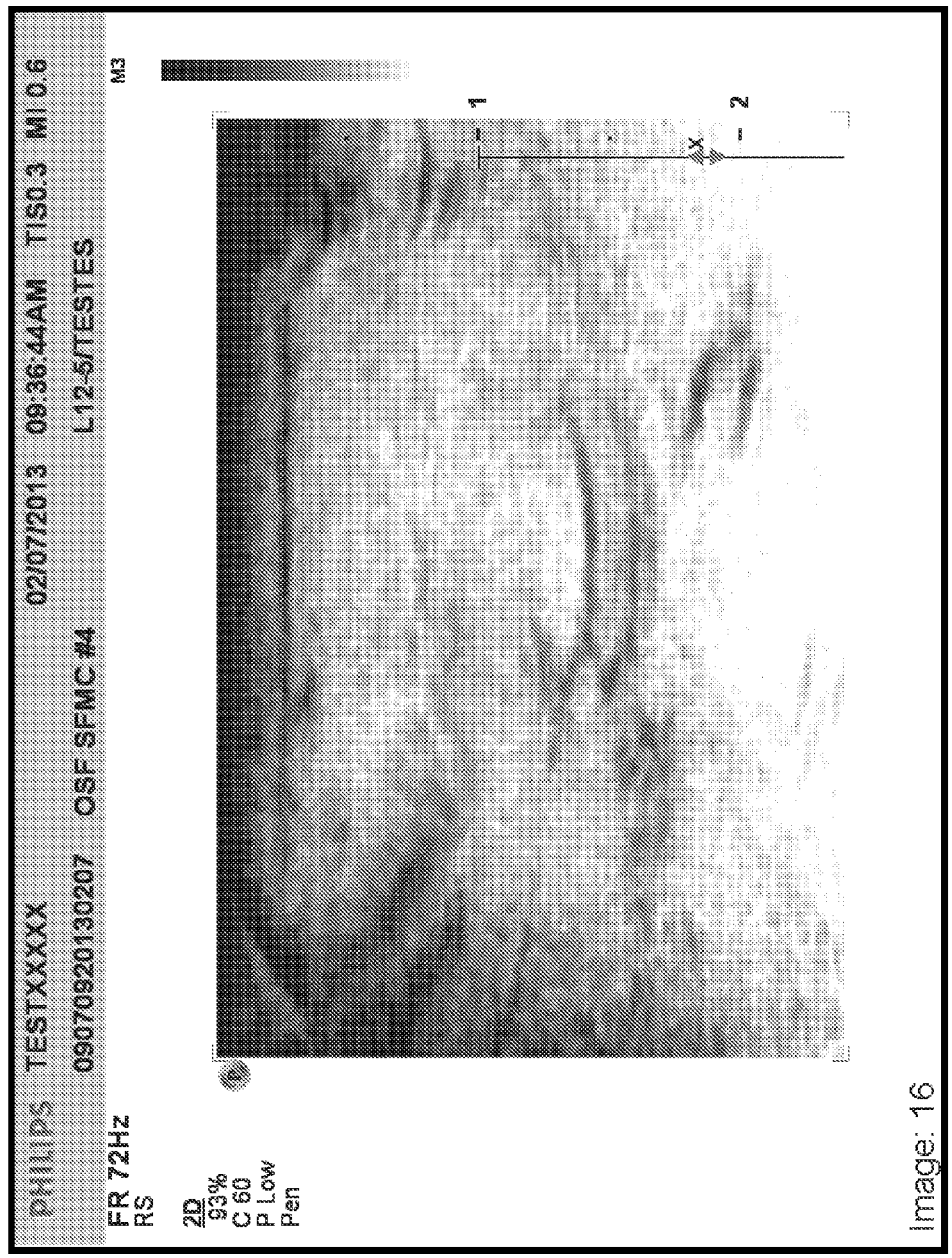
Figure 31:
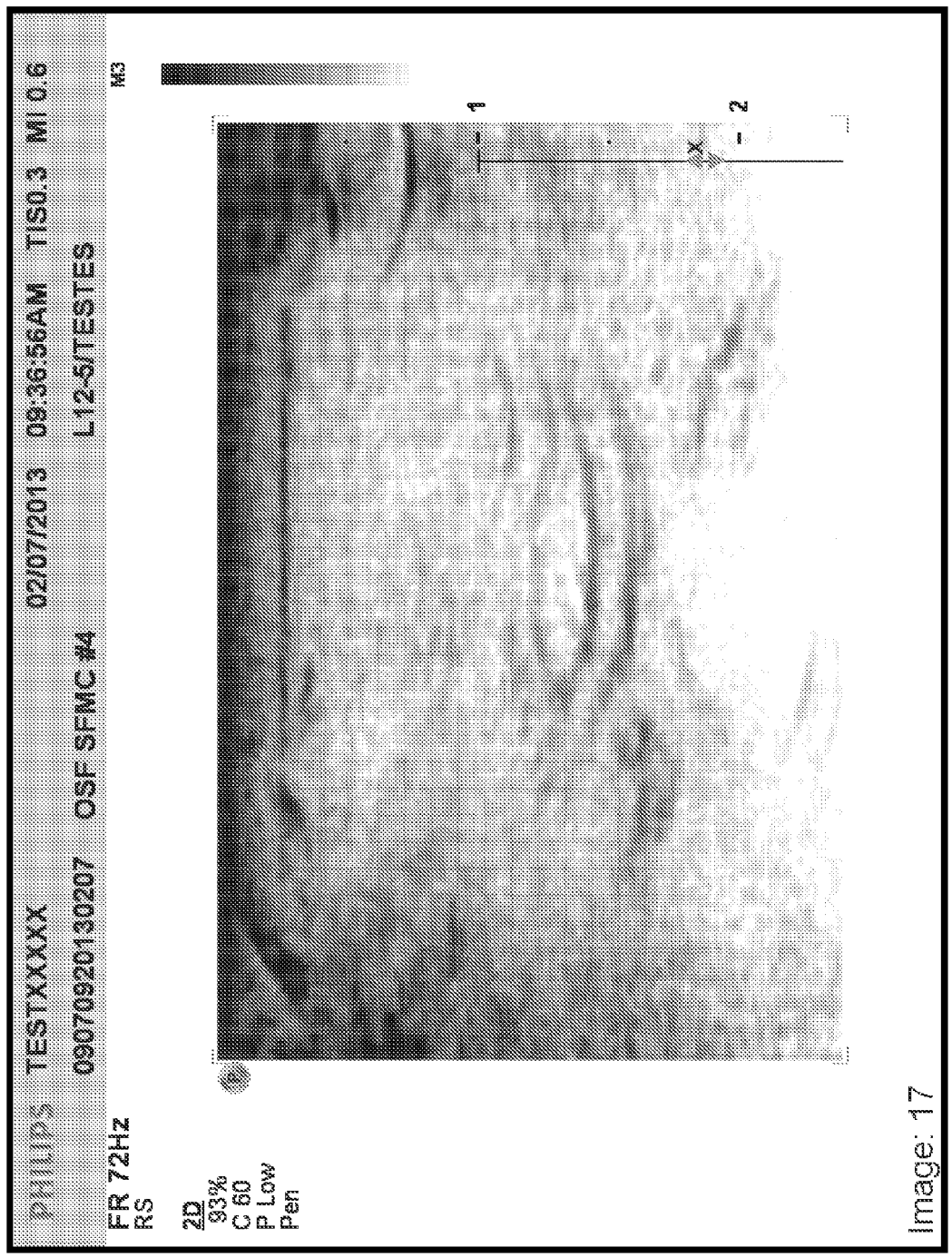
Figure 32:
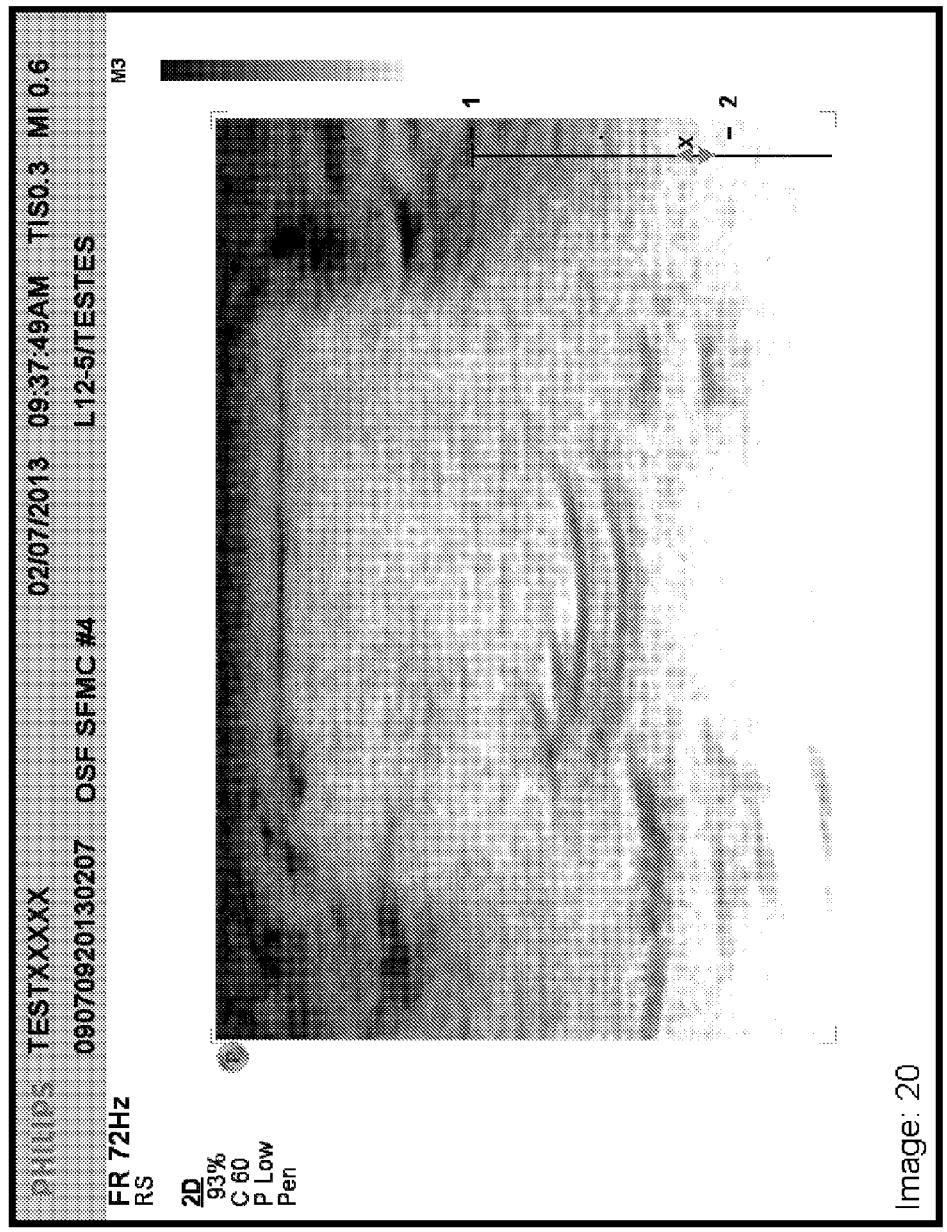
Figure 33:
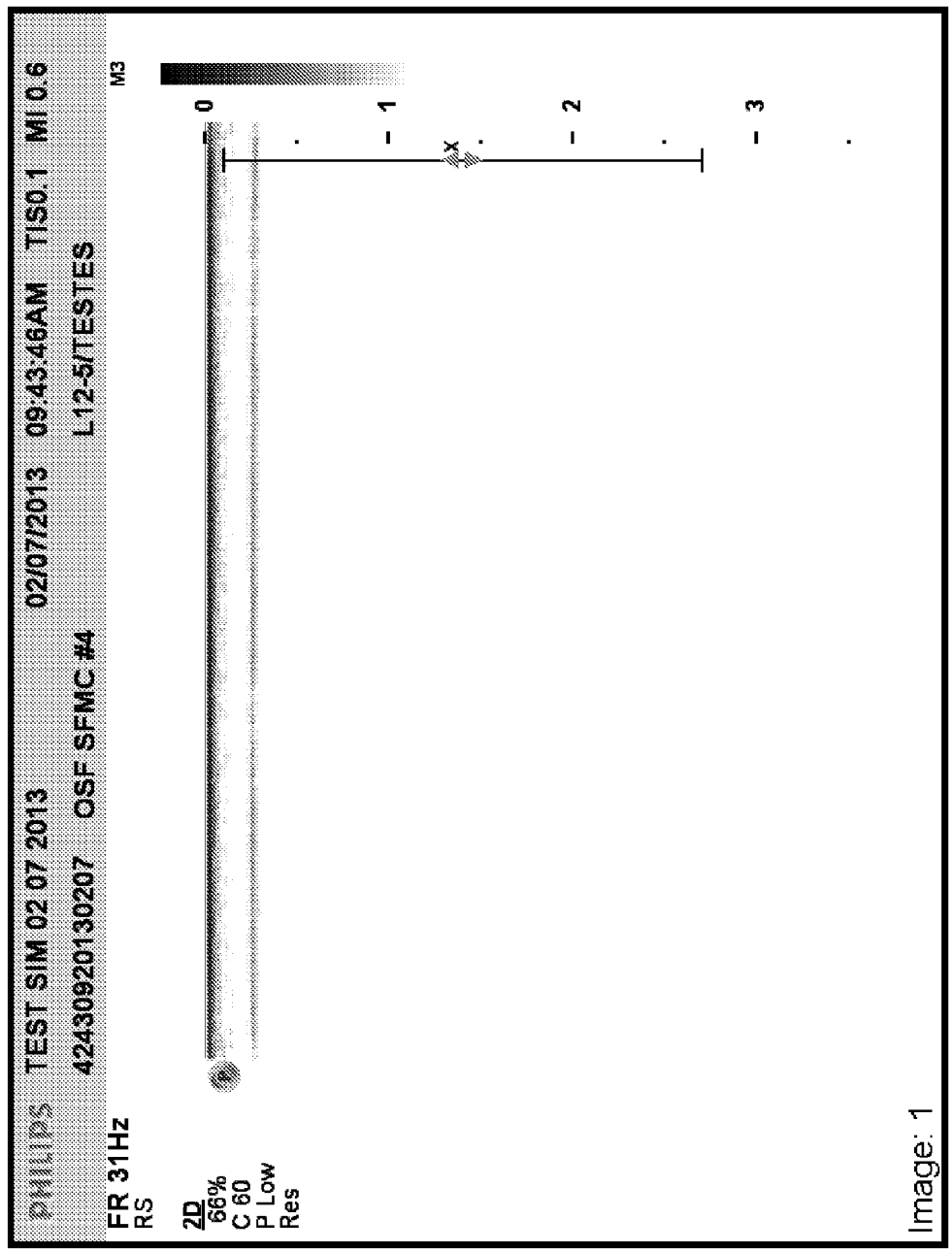

FIGS. 7 and 8 are circuit diagrams, where FIG. 7 shows a circuit for controlling a valve according to an embodiment of the present invention, and FIG. 8 shows a circuit for controlling a pump according to an embodiment of the present invention. FIG. 9 shows a circuit for the valves, pumps, and the Bluetooth module all connected to the microcontroller 9.

Individual components of the embodiments of the present invention will now be described in more detail.

In a preferred embodiment of the present invention, the fluid reservoirs 1 serve as the storage containers from which the pumps 2, 8 pull fluid. The fluid reservoirs 1 simulate the total blood in circulation in the body.

In a preferred embodiment of the present invention, the pump 2 is a positive displacement electric fluid pump. In the system of the preferred embodiment of the present invention, the pump 2 is simulating the heart, sending fluid at high pressures from the reservoir 1 through the valve system and anatomy, and eventually ending up back in the reservoir 1. Because the pump 2 simulates the heart, it pumps in various intervals pulling fluid from the fluid reservoir 1. An example of a pump 2 that may be used in the embodiments of the present invention is a Swiftech® MCP35X pump. Preferably, the pump 2 of the embodiments of the present invention includes a variable control speed.

The pinch valves 3 in a preferred embodiment of the present invention are modified solenoid pinch valves. These pinch valves 3 are modified such that they cannot shut completely. This modification allows the system of the preferred embodiment of the present invention to simulate diastolic blood flow more accurately. By changing the on/off timings for the pinch valves 3 the waveform may be altered.

In a preferred embodiment of the present invention, the dual fluid line control system 4 uses the parallel line 14 to indirectly control the amount of fluid that enters the main line 13. By increasing or decreasing the resistance of the parallel line 14, the amount of fluid through the main line 13 increases or decreases. Thus, in a preferred embodiment of the present invention, only the fluid flow through the main line 13 is seen by the ultrasound unit 12.

The proportional valve 5 in a preferred embodiment of the present invention serves to change the resistance of the circuit, thereby changing the amount of fluid flow, increasing the ability to model different flow conditions.

In a preferred embodiment of the present invention, the anatomical unit 6 is a part of the body that the users will be testing with the ultrasound device 12 in the ultrasound active region 16. As stated above, the embodiments of the present invention are not limited to one specific anatomical unit 6. Rather, many different anatomical units 6 may be used in accordance with the embodiments of the present invention. Different flow scenarios may be developed based on conditions specific to the anatomical unit 6.

The air pockets 7 in a preferred embodiment of the present invention are located in the arterial and venous lines upon exit from the anatomy 6. The introduction of air pockets 7 hides everything outside the anatomy 6 from the ultrasound device 12. In other words, the air pockets 7 function to hide the ultrasound signal.

In a preferred embodiment of the present invention, the reversible pump 8 is a positive displacement electric fluid pump. The reversible pump 8 serves to simulate venous flow.

The microcontroller 9 in a preferred embodiment of the present invention includes an electronic component that comes pre-programmed with different flow conditions. In a preferred embodiment of the present invention, the microcontroller 9 can be controlled by an Android device or similar (e.g., smart phone, tablet, computer) via Bluetooth or similar (e.g., wireless or wired technology for transmitting data).

In a preferred embodiment of the present invention, the transistor circuits 10 are the electronic hardware that serve as switches to control the valves 3, 5 and pumps 2, 8 using the microcontroller 9.

A preferred embodiment of the present invention includes an application ("app") 11 on, for example, an Android device. The application 11 provides a graphical user interface (GUI) 20 where a user can choose the condition they wish to simulate. The application 11 further allows a user to customize each simulation by changing the heart rate and degree of vascular resistance of the simulated patient. In a preferred embodiment of the present invention, the application 11 controls the microcontroller 9 via Bluetooth or similar.

In a preferred embodiment of the present invention, the ultrasound device 12 allows for users (trainees) to visualize the waveforms and diagnose the simulated patient. Further, embodiments of the present invention can include other Doppler devices. For example, an embodiment of the present invention includes an audio only Doppler device such as the type used in detecting a fetal heart beating inside the womb.

The valves 3, 5 on the main 13 and parallel 14 lines serve to modify the flow to create a waveform. The valves 3, 5 alter the amount of fluid that runs through the system of the embodiments of the present invention. The pinch valves 3 of the preferred embodiment of the present invention allow incomplete flow. The proportional valve 5 alters the degree of the flow that goes through the artery 17 in the anatomical unit 6. In a preferred embodiment of the present invention, the proportional valve 5 can be adjusted to alter the flow to simulate different arterial conditions of the anatomical unit 6 (e.g., a human being with an arterial disease).

Although many of the embodiments of the present invention described throughout this application include ultrasound devices, one skilled in the art will understand that the embodiments of the present invention may be used for training purposes (or otherwise) without ultrasound devices.

As used throughout this application, "blood" or "fluid" may be any fluid that would be desirous to be pumped through the systems and devices of the embodiments of the present invention.

An embodiment of the present invention includes a system that comprises all of the components that simulate blood flow patterns (valves, piping, etc.). The system may also include an ultrasound device.

An embodiment of the present invention creates a flow pattern that makes water flow like the human condition in a pathological state. This flow pattern can simulate a diseased condition or a normal state. For example, an embodiment of the present invention can simulate: normal flow, disease state flow, and no flow conditions.

It is envisioned that the embodiments of the present invention can be used in a variety of existing devices that are static.

An embodiment of the present invention includes open wireless technology control (e.g., Bluetooth control). Another embodiment of the present invention includes a manual control system.

Various anatomical forms of the embodiments of the present invention will now be described.

Testicular Torsion Model:

Testicular torsion is torsion (i.e., the act of twisting or turning) of the testes and spermatic cord. This is frequently associated with loss of blood supply to the testicle with irreversible damage occurring within hours. Rapid differential diagnosis is critical with testicular torsion cases because surgical detorsion of a torsed testicle results in 100% viability at 4-6 hours, 20% viability at 12 hours and 0% viability at 24 hours. Even in the highest risk population (boys age 0-19 years), only 16% of patients with acute scrotal pain have torsion. The ability to rapidly separate torsion from nontorsion using a readily available technology like ultrasound would allow physicians to rapidly refer probable testicular torsion for surgical intervention as well as avoid unnecessary transfers of non-torsion cases. This would be particularly critical for rural and/or international sites with limited access to urologic referral. Thus, time is a major factor in the treatment of testicular torsion.

Therefore, an embodiment of the present invention utilizes a lifelike model of one or a pair of testicles that will be able to reproduce the sonographic findings of causes of acute scrotal pain and will thus train providers to rule out torsion. The users of this device (both those in training and in practice) include (but are not limited to): high priority emergency department physicians, radiology physicians, ultrasound technicians, secondary priority, rural physicians, and international physicians. One of the specific benefits of the device of the embodiments of the present invention is that the conditions are so uncommon that during the routine process of training, a learner may not encounter a specific abnormality. The embodiments of the present invention produce a training and learning opportunity that standardizes training.

The anatomical models in this embodiment of the present invention are capable of generating multiple different vascular sonographic findings ranging from clear cut diagnostic patterns to more subtle findings. In an embodiment of the present invention, either testicle may be the symptomatic testicle, and the testicles can be anatomically correct and of lifelike size and consistency.

The waveform generator in this embodiment of the present invention can simulate venous and arterial sonographic flow in lifelike sized vessels, pulsatile arterial flow, and modifiable vascular (flow) resistance mimicking impaired to completely occluded veins creating a diversity of wave forms that match clinical scenarios. Additionally, an embodiment of the present invention can include capillary type distensible vascular bed mimicking the testes. Another feature of the testicular torsion device may be to provide and utilize a model to accurately distinguish torsion from nontorsion in a series of cases with accompanying sonographic patterns.

Further, the waveform generator in the embodiments of the present invention can simulate the carotid artery and jugular veins, heart, femoral artery and vein, veins of the deep venous system, vascular shunts, upper arm arteries and veins, and the like. In other words, the waveform generator coupled with different anatomical models can simulate all forms of blood flow in a body.

The controller unit of the preferred embodiment of the present invention preferably includes the user interface 20 on a device such as a tablet. The waveform generator includes the pump and related equipment. In an embodiment of the present invention, service lines flow into the anatomical unit 6.

The embodiments of the present invention further include a method of making the simulation device 100 as described herein and a method of using the simulation device 100 as described herein.

We claim:

1. A device for simulating blood flow comprising:
   an anatomical unit including a sealed housing designed to replicate anatomical conditions in a human body; and
   a waveform generator for generating waveforms, the waveform generator comprising:
   a pump capable of pumping a fluid through at least one fluid line and thereby transmitting the waveform from the waveform generator through the fluid line, wherein the fluid line is disposed inside and outside the anatomical unit;
   a bifurcation point capable of splitting the fluid line into a plurality of fluid lines, wherein the plurality of fluid lines comprise a main line and a parallel line, wherein each fluid line is capable of transmitting the waveform;
   a plurality of valves capable of at least partially occluding fluid flow,
   wherein the plurality of valves include at least two pinch valves and at least one proportional valve,
   wherein the main line and parallel line each include one of the at least two pinch valves,
   wherein the main line includes the at least one proportional valves,
   wherein one of the at least two pinch valves is capable of dynamically modulating pressure drop at the proportional valve,
   wherein the at least one proportional valve is capable of modulating static resistance of the waveform through the at least one fluid line,
   a reservoir capable of housing the fluid, and
   an air pocket disposed in the fluid line upon exit from the anatomical unit, wherein the air pocket hides everything outside the anatomical unit from an ultrasound machine;
   wherein the waveforms enter and exit the anatomical unit and the waveform generator through the fluid lines simulating blood flow,
   wherein one of the at least two pinch valves develops pressure and resistance at the at least one proportional valve, and
   wherein the valves are capable of controllably producing a continuous range of flow from no flow up to the flow the pump is capable of pumping over an interval of time to produce a waveform.

2. The device according to claim 1, wherein the anatomical unit replicates one or more sections of a human body.

3. The device according to claim 1, wherein the waveform generator is a separate element disposed in its own housing.

4. The device according to claim 1, further comprising an ultrasound machine.

5. The device according to claim 1, wherein the waveform generator and the fluid lines create a fluid velocity profile that matches physiological conditions common to the field of diagnostic radiology.

6. The device according to claim 1, wherein the anatomical unit comprises a sealed container, wherein the sealed container has the ability to connect fluid lines maintained within the sealed container to an exterior device.

7. The device according to claim 1, further comprising a device for altering or transmitting the waveforms generated by the waveform generator.

8. The device according to claim 7, wherein the device for altering or transmitting the waveforms comprises hydraulic lines.

9. The device according to claim 7, wherein the device for altering or transmitting the waveforms comprises a positive displacement fluid pump.

10. The device according to claim 1, wherein the anatomical unit comprises silicone, latex rubber, or a similar soft rubber composite.

11. The device according to claim 1, wherein the pump is a positive displacement electric fluid pump.

12. The device according to claim 1, wherein the valves of the waveform generator include solenoid valves.

13. The device according to claim 1, further comprising a control system with a user interface.

14. The device according to claim 13, wherein the control system comprises a programmable circuit board.

15. The device according to claim 1, further comprising a plurality of fluid flow circuits, wherein the plurality of fluid flow circuits are capable of operating simultaneously.

16. The device according to claim 1, further comprising open wireless technology control.

17. A device for simulating blood flow comprising:
an anatomical unit including a sealed housing designed to replicate anatomical conditions in a human body; and
a waveform generator for generating waveforms, the waveform generator comprising:
  a pump capable of pumping a fluid through at least one fluid line and thereby transmitting the waveform from the waveform generator through the fluid line,
  wherein the fluid line is disposed inside and outside the anatomical unit;
  a bifurcation point capable of splitting the fluid line into a plurality of fluid lines, wherein the plurality of fluid lines comprise a main line and a parallel line,
  wherein each fluid line is capable of transmitting the waveform;
  a plurality of valves capable of at least partially occluding fluid flow;
  wherein the plurality of valves include at least two pinch valves and at least one proportional valve,
  wherein the main line and parallel line each include one of the at least two pinch valves,
  wherein the main line includes the at least one proportional valves,
  wherein one of the at least two pinch valves is capable of modulating systolic versus diastolic pressure,
  wherein the at least one proportional valve is capable of modulating static resistance of the waveform through a fluid line;
  a reservoir capable of housing the fluid; and
  an air pocket disposed in the fluid line upon exit from the anatomical unit, wherein the air pocket hides everything outside the anatomical unit from an ultrasound machine;
  a programmable circuit board capable of controlling at least the pump; and
  a dual fluid line control system,
  wherein waveforms enter and exit the waveform generator through the fluid lines, and
  wherein the waveform generator and the fluid lines create a fluid velocity profile that matches physiological conditions common to the field of diagnostic radiology,
  wherein on of the at least two pinch valves develops pressure and resistance at the at least one proportional valve, and
  wherein the valves are capable of controllably producing a continuous range of flow from no flow up to the flow the pump is capable of pumping over an interval of time to produce a waveform.

18. A device for simulating blood flow comprising:
an anatomical unit including a sealed housing designed to replicate anatomical conditions in a human body including at least one testicle;
a waveform generator for generating waveforms, the waveform generator comprising:
  a positive displacement electric fluid pump capable of pumping a fluid simulating blood flowing through at least one fluid line simulating an artery and thereby transmitting the waveform from the waveform generator through the fluid line,
  wherein the fluid line is disposed inside and outside the anatomical unit;
  a bifurcation point capable of splitting the fluid line into a plurality of fluid lines, wherein the plurality of fluid lines comprise a main line and a parallel line,
  wherein each fluid line is capable of transmitting the waveform;
  an arterial flow fluid reservoir capable of housing the fluid; and
  a plurality of valves capable of at least partially occluding fluid,
  wherein the plurality of valves include at least two pinch valves and at least one proportional valve,
  wherein the main line and parallel line each include one of the at least two pinch valves,
  wherein the main line includes the at least one proportional valves,
  wherein one of the at least two pinch valves is capable of modulating systolic versus diastolic pressure,
  wherein the at least one proportional valve is capable of modulating static resistance of the waveform through the at least one fluid line,
  a reversible pump, wherein the reversible pump is a positive displacement electric fluid pump capable of pumping a fluid simulating blood flowing through at least one fluid line simulating a vein;
  a venous flow fluid reservoir capable of housing the fluid; a programmable circuit board capable of controlling the pumps;
  a plurality of air pockets disposed in the fluid line upon exit from the anatomical unit;
  an ultrasound machine to obtain information from the waveforms,
  wherein the air pocket hides everything outside the anatomical unit from the ultrasound machine; and
  a control system for controlling the device,
  wherein the waveform generator and the fluid lines create a fluid velocity profile that matches physiological conditions common to the field of diagnostic radiology,
  wherein one of the at least ene two pinch valves develops pressure and resistance at the at least one proportional valve, and
  wherein the valves are capable of controllably producing a continuous range of flow from no flow up to the flow the pump is capable of pumping over an interval of time to produce a waveform.

19. A system for simulating blood flow comprising:
a device comprising:
an anatomical unit including a sealed housing designed to replicate anatomical conditions in a human body; and
a waveform generator for generating waveforms, the waveform generator comprising:
  a pump capable of pumping a fluid through at least one fluid line and thereby transmitting the waveform from the waveform generator through the fluid line,
  wherein the fluid line is disposed inside and outside the anatomical unit;
  a bifurcation point capable of splitting the fluid line into a plurality of fluid lines, wherein the plurality of fluid lines comprise a main line and a parallel line,
  wherein each fluid line is capable of transmitting the waveform;
  a plurality of valves capable of at least partially occluding fluid flow,
  wherein the plurality of valves include at least two pinch valves and at least one proportional valve,
  wherein the main line and parallel line each include one of the at least two pinch valves,
  wherein the main line includes the at least one proportional valves,
  wherein one of the at least two pinch valves is capable of modulating systolic versus diastolic pressure, wherein the at least one proportional valve is capable of modulating static resistance of the waveform through a fluid line;
a reservoir capable of housing the fluid; and
a programmable circuit board capable of controlling at least the pump; and
an air pocket disposed in the fluid line upon exit from the anatomical unit;
an ultrasound machine to obtain information from the waveforms,
wherein the air pocket hides everything outside the anatomical unit from the ultrasound machine; and
a dual fluid line control system,
wherein waveforms enter and exit the waveform generator through the fluid lines, and
wherein the waveform generator and the fluid lines create a fluid velocity profile that matches physiological conditions common to the field of diagnostic radiology,
wherein one of the at least two pinch valves develops pressure and resistance at the at least one proportional valve, and
wherein the valves are capable of controllably producing a continuous range of flow from no flow up to the flow the pump is capable of pumping over an interval of time to produce a waveform.

* * * * *